(12) United States Patent
Choi et al.

(10) Patent No.: US 11,184,076 B2
(45) Date of Patent: Nov. 23, 2021

(54) ELECTRONIC DEVICE THAT USES VIRTUAL FIELD TO RESERVE TRANSMISSION AND RECEPTION TIME OF RADAR SIGNAL AND CONTROL METHOD THEREOF

(71) Applicant: Samsung Electronics Co., Ltd., Suwon-si (KR)

(72) Inventors: Junsu Choi, Suwon-si (KR); Chiho Kim, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/028,169

(22) Filed: Sep. 22, 2020

(65) Prior Publication Data
US 2021/0091840 A1 Mar. 25, 2021

(30) Foreign Application Priority Data
Sep. 25, 2019 (KR) .................. 10-2019-0118265

(51) Int. Cl.
*H04B 7/06* (2006.01)
*H04L 25/02* (2006.01)
(Continued)

(52) U.S. Cl.
CPC ............ *H04B 7/0684* (2013.01); *H04B 1/44* (2013.01); *H04B 7/0417* (2013.01); *H04L 25/0204* (2013.01)

(58) Field of Classification Search
CPC ...... H04B 7/0684; H04B 1/44; H04B 7/0417; H04B 25/0204
See application file for complete search history.

(56) References Cited

U.S. PATENT DOCUMENTS

| | | | |
|---|---|---|---|
| 2016/0029403 A1 | 1/2016 | Roy et al. | |
| 2018/0199377 A1* | 7/2018 | Sanderovich | H04W 74/0816 |

(Continued)

FOREIGN PATENT DOCUMENTS

| | | |
|---|---|---|
| WO | 2015/017463 A2 | 2/2015 |
| WO | 2017/207042 A1 | 12/2017 |
| WO | 2018/132126 A1 | 7/2018 |

OTHER PUBLICATIONS

Kasher et al., IEEE P 802.11-18/2095r1 "Wireless LANs. Allowing Radar within Wireless LAN." Published Jan. 16, 2019.
(Continued)

*Primary Examiner* — Jaison Joseph
(74) *Attorney, Agent, or Firm* — Jefferson IP Law, LLP

(57) ABSTRACT

An electronic device and a control method thereof are provided. The electronic device includes an array antenna and a communication circuit which is electrically connected to the array antenna. The communication circuit is configured to determine a number of specified fields for reserving time for outputting a first signal through the array antenna and receiving a reflection signal corresponding to the first signal reflected by an external object, generate a second signal including information about the number of specified fields, and output the first signal through the array antenna after transmitting the generated second signal to an external electronic device through the array antenna, and receive the reflection signal corresponding to the output first signal.

22 Claims, 22 Drawing Sheets

(51) Int. Cl.
H04B 7/0417 (2017.01)
H04B 1/44 (2006.01)

(56) References Cited

U.S. PATENT DOCUMENTS

| | | |
|---|---|---|
| 2019/0056476 A1* | 2/2019 | Lin .................. G01S 13/343 |
| 2020/0072963 A1* | 3/2020 | Yu .................. G01S 13/931 |
| 2021/0003662 A1* | 1/2021 | Aydogdu .............. G01S 7/0235 |
| 2021/0119664 A1* | 4/2021 | Ben-Sinai ............ H04W 48/16 |
| 2021/0173065 A1* | 6/2021 | Trainin ................ G01S 13/325 |

OTHER PUBLICATIONS

Oteri et al., IEEE P 802.11-17/0040r2. "Further discussion for WLAN Radar." Published Jan. 16, 2019.
Han et al., IEEE 802.11-19/0080r0 "Beam Tracking for 802.11ay." Published Jan. 17, 2017.
International Search Report and Written Opinion dated Dec. 23, 2020, issued in International Application No. PCT/KR2020/012849.

* cited by examiner

The sequence $Ga_{128}(k)$

| The sequence $Ga_{128}(k)$, to be transmitted from left right, up to down |
|---|
| +1 +1 -1 -1 -1 -1 -1 -1 +1 -1 +1 +1 -1 +1 +1 +1 -1 -1 +1 +1 +1 +1 -1 +1 -1 +1 -1 +1 +1 -1 <br> -1 -1 +1 +1 +1 +1 +1 +1 -1 +1 -1 -1 +1 -1 -1 -1 -1 +1 +1 +1 +1 -1 +1 -1 +1 -1 +1 +1 -1 <br> +1 +1 -1 -1 -1 -1 -1 -1 +1 -1 +1 +1 -1 +1 +1 +1 -1 -1 +1 +1 +1 +1 -1 +1 -1 +1 -1 +1 +1 -1 <br> +1 +1 -1 -1 -1 -1 -1 -1 +1 -1 +1 +1 -1 +1 +1 +1 +1 -1 -1 -1 -1 +1 -1 +1 -1 +1 -1 -1 +1 |

The sequence $Gb_{128}(k)$

| The sequence $Gb_{128}(k)$, to be transmitted from left right, up to down |
|---|
| -1 -1 +1 +1 +1 +1 +1 +1 -1 +1 -1 -1 +1 -1 -1 -1 -1 +1 -1 -1 -1 -1 +1 -1 +1 -1 +1 -1 -1 +1 <br> +1 +1 -1 -1 -1 -1 -1 -1 +1 -1 +1 +1 -1 +1 +1 +1 -1 -1 +1 -1 -1 -1 +1 -1 +1 -1 +1 -1 -1 +1 <br> +1 +1 -1 -1 -1 -1 -1 -1 +1 -1 +1 +1 -1 +1 +1 +1 -1 -1 +1 +1 +1 +1 -1 +1 -1 +1 -1 +1 +1 -1 <br> +1 +1 -1 -1 -1 -1 -1 -1 +1 -1 +1 +1 -1 +1 +1 +1 -1 -1 -1 -1 -1 -1 +1 -1 +1 -1 +1 -1 -1 +1 |

FIG.8

ELECTRONIC DEVICE THAT USES VIRTUAL FIELD TO RESERVE TRANSMISSION AND RECEPTION TIME OF RADAR SIGNAL AND CONTROL METHOD THEREOF

CROSS-REFERENCE TO RELATED APPLICATION(S)

This application is based on and claims priority under 35 U.S.C. § 119(a) of a Korean patent application number 10-2019-0118265, filed on Sep. 25, 2019, in the Korean Intellectual Property Office, the disclosure of which is incorporated by reference herein in its entirety.

BACKGROUND

1. Field

The disclosure relates to an electronic device which reserves transmission and reception time of a radar signal using a virtual field and a control method thereof.

2. Description of Related Art

Various services and additional functions provided through electronic devices, for example, portable electronic devices such as smart phones, have gradually increased. In order to increase the utility value of these electronic devices and satisfy the needs of various users, communication service providers or electronic device manufacturers provide various functions and competitively develop electronic devices for differentiation from other companies. Accordingly, various functions provided through the electronic device have gradually advanced.

In an electronic device which supports both a radar function for detecting an object located outside the electronic device (for example, for detecting a distance between the electronic device and the object), and data communication, the data communication may be interrupted by the radar function. For receiving a specific frame normally, a preamble of the specific frame needs to be normally received. However, if transmission of a frame for a data communication is performed by an external electronic device (e.g., a base station) at a time point at which a signal for performing the radar function (in the disclosure, it may be briefly referred to as the term "a radar signal" or "a radar pulse") is output or received, the transmitted frame may not be normally received. As such, a frame which is not normally received may be considered as error frame transmission. If transmission and reception of a radar signal is frequently performed to perform a radar function, a frame error rate may increase, so a transmission rate may decrease. As a result, performance degradation of an electronic device may occur.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and an operating method of the electronic device are disclosed. The electronic device includes information about a specified field in a signal transmitted to an external electronic device to transmit the signal, thereby the external electronic device may maintain a reception standby state for the specified field.

Additional aspects will be set forth in part in the description which follows and, in part, will be apparent from the description, or may be learned by practice of the presented embodiments.

In accordance with an aspect of the disclosure, an electronic device and an operating method of the electronic device are provided. The electronic device transmits and receives a radar signal while an external electronic device maintains a reception standby state for a specified field, thereby the electronic device may perform transmission and reception of a data signal and transmission and reception of the radar signal together without degrading performance of the electronic device.

In accordance with another aspect of the disclosure, an electronic device is provided. The electronic device includes a communication circuit and at least one processor, and the at least one processor may be configured to determine a number of specified fields for reserving time for outputting a first signal and receiving a reflection signal that the first signal is reflected on an external object, generate a second signal including information about the number of specified fields, and output the first signal through the communication circuit after transmitting the generated second signal to an external electronic device, and receive the reflection signal.

In accordance with an aspect of the disclosure, an electronic device is provided. The electronic device includes a communication circuit and at least one processor, and the at least one processor may be configured to determine whether to perform beam forming training, determine a number of specified fields according to a first scheme if it is determined that the beam forming training will not be performed, and determine the number of specified fields according to a second scheme different from the first scheme if it is determined that the beam forming training needs to be performed.

In accordance with an aspect of the disclosure, an electronic device is provided. The electronic device includes an antenna array and at least one processor, and the at least one processor may be configured to set a part of the antenna array to a transmission (Tx) state and set a remaining part of the antenna array to reception (Rx) state if a signal to be output is a first signal, and set all of the antenna array to the Tx state if the signal to be output is a second signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram for describing information included in a TRN field according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
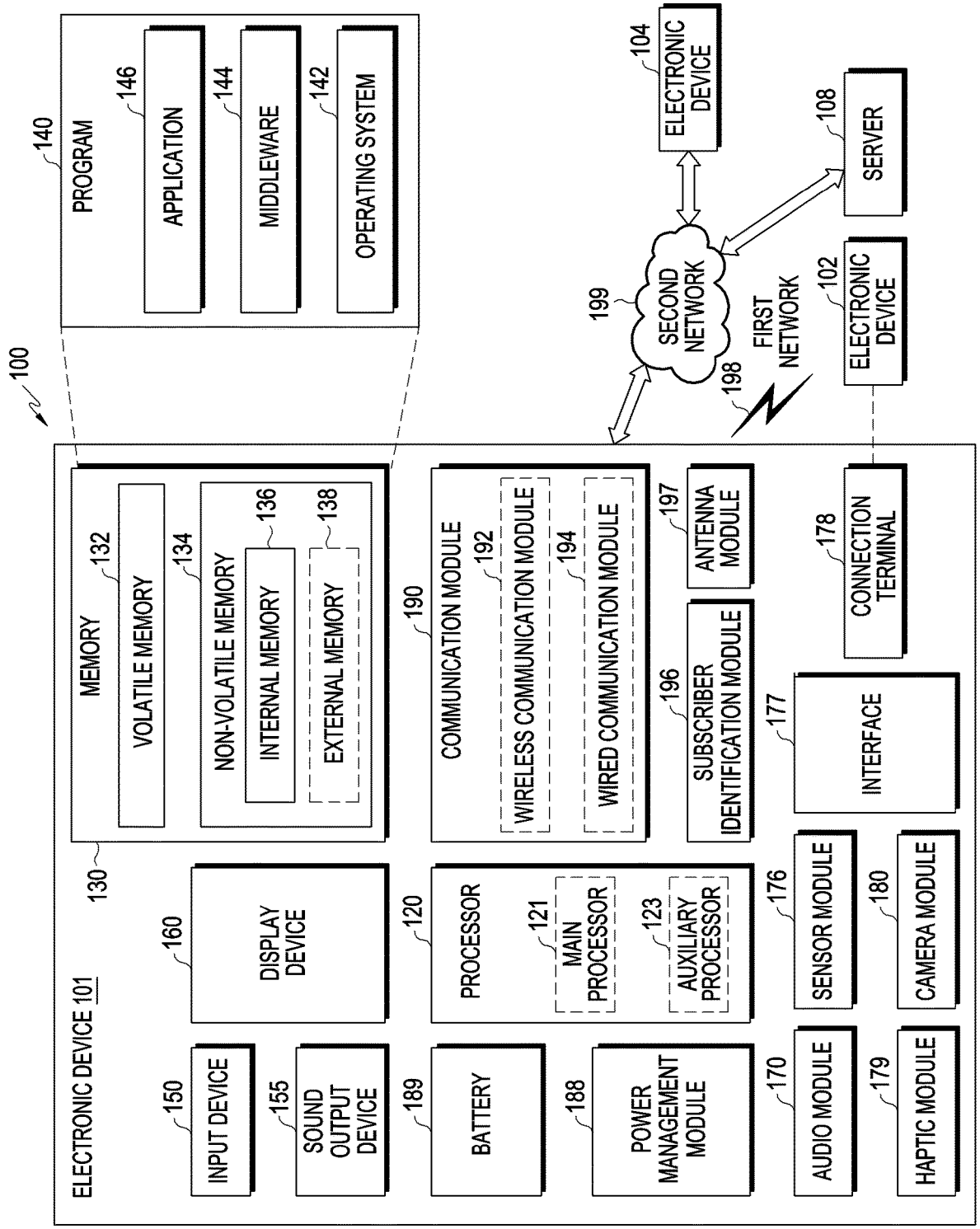
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting (or connection) terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
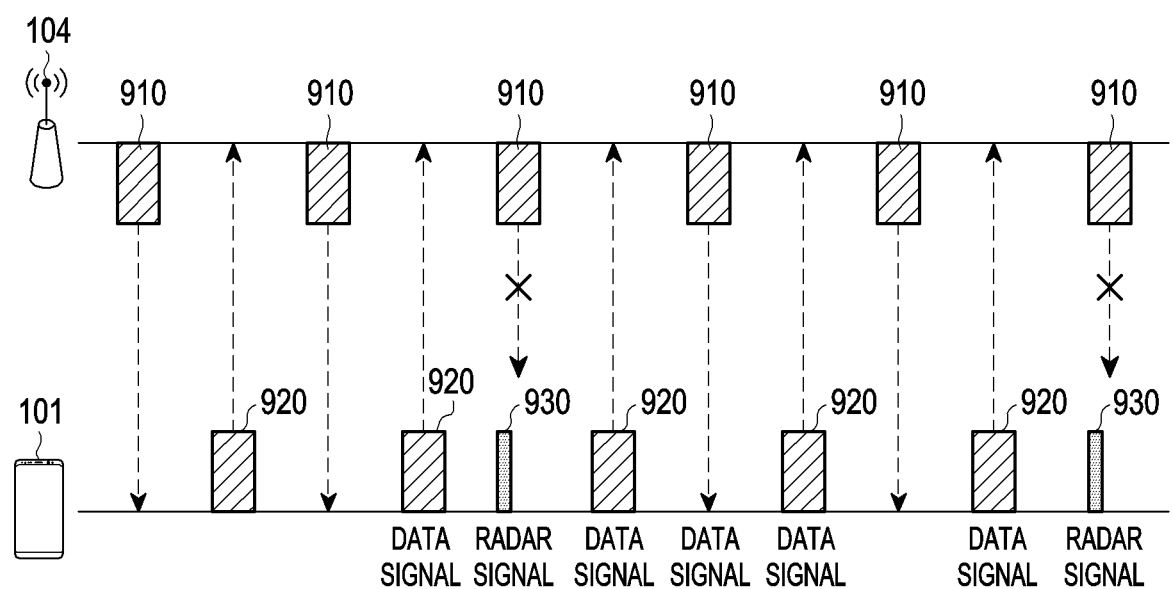
FIG. 2 is a diagram for describing a problem in a case of performing a radar function while performing a data communication according to an embodiment of the disclosure.

FIG. 2 is a diagram for describing a problem in a case of performing a radar function while performing a data communication according to an embodiment of the disclosure.

Referring to FIG. 2, an electronic device 101 may receive or transmit a signal for a data communication (e.g., a reception signal 910 and a transmission signal 920) with an external electronic device 104 (e.g., a base station) through a communication module 190. If transmission of the reception signal 910 for the data communication is performed by the external electronic device 104 (e.g., the base station) at a time point at which a radar signal 930 for performing a radar function is output or received in the electronic device 101, the reception signal 910 transmitted at the time point may not be normally received in the electronic device 101.

Figures 3A, 3B:
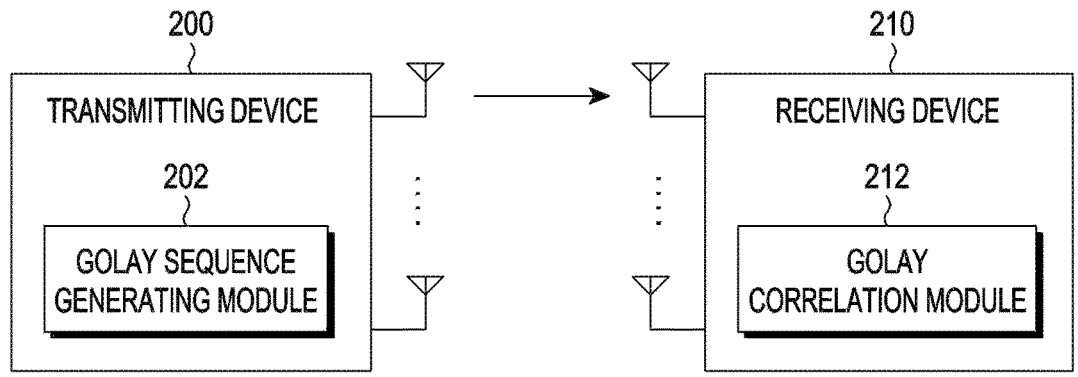
FIG. 3A is a diagram for describing a transmitting device 200 and a receiving device 210 according to an embodiment of the disclosure.
FIG. 3B is a diagram for describing a Golay sequence according to an embodiment of the disclosure.

FIG. 3A is a diagram for describing a transmitting device 200 and a receiving device 210 according to an embodiment of the disclosure.

FIG. 3B is a diagram for describing a Golay sequence according to an embodiment of the disclosure.

Figure 3C:
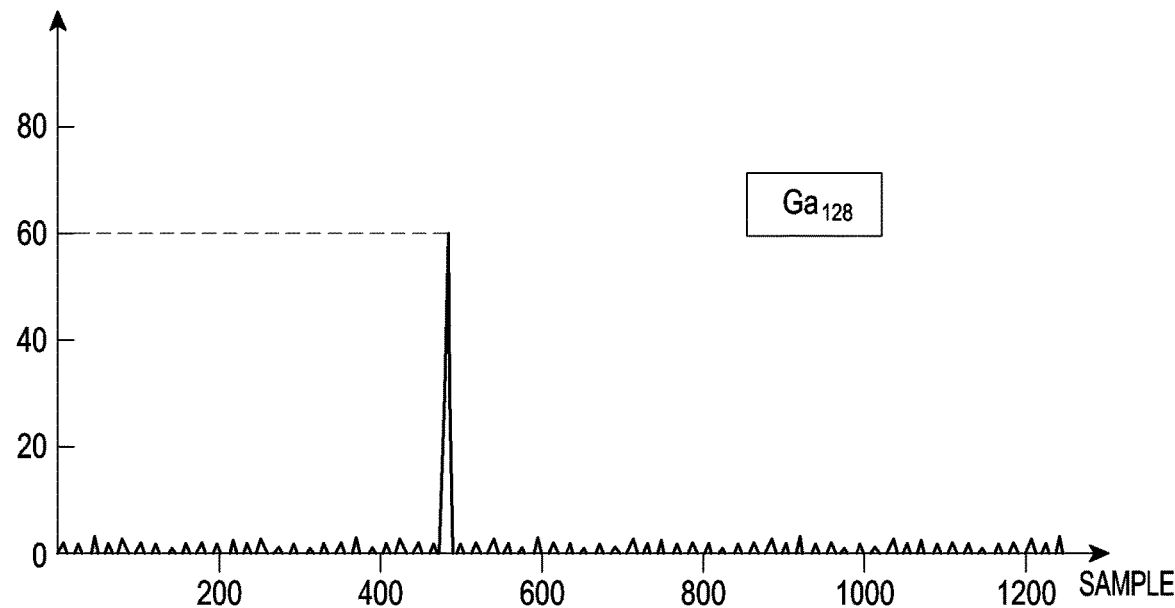
FIGS. 3C and 3D are diagrams for describing an auto-correlation result of a Golay sequence (e.g., Ga128 and Gb128) according to various embodiments of the disclosure.
Figure 3D:
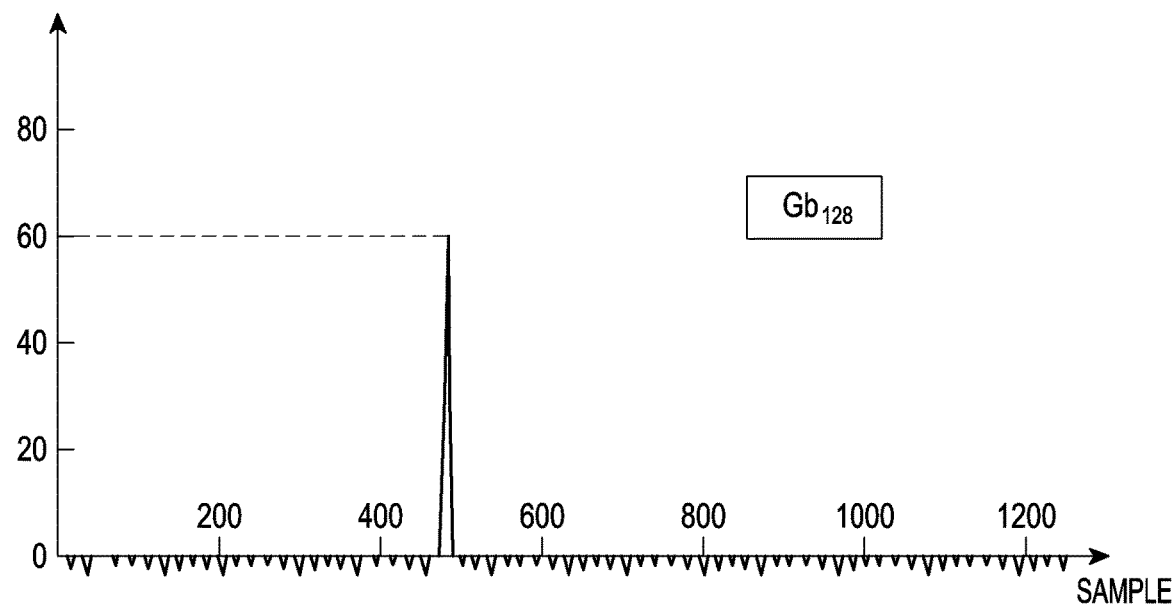

FIGS. 3C and 3D are diagrams for describing an auto-correlation result of a Golay sequence (e.g., Ga128 and Gb128) according to various embodiments of the disclosure.

Figure 3E:
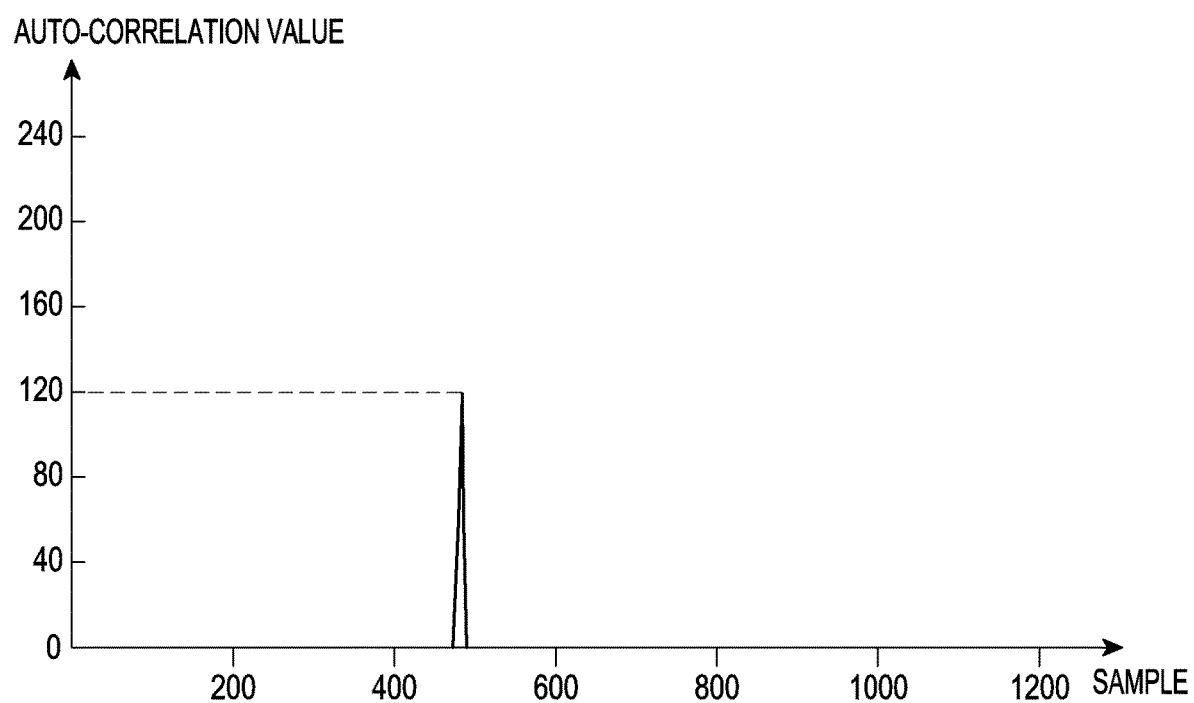
FIG. 3E is a diagram for describing a sum of auto-correlation results of a Golay sequence (e.g., Ga128 and Gb128) according to an embodiment of the disclosure.

FIG. 3E is a diagram for describing a sum of auto-correlation results of a Golay sequence (e.g., Ga128 and Gb128) according to an embodiment of the disclosure.

Referring to FIG. 3A, a transmitting device 200 according to various embodiments of the disclosure may include at least one base station. The transmitting device 200 according to various embodiments of the disclosure may include a Golay sequence generating module 202. The Golay sequence generating module 202 according to various embodiments of the disclosure may generate a signal for channel estimation (e.g., a reference signal) using Equation 1. The Golay sequence generating module 202 according to various embodiments of the disclosure may generate a Golay sequence through a recursive procedure. The transmitting device 200 according to various embodiments of the disclosure may transmit a signal including the Golay sequence to a receiving device 210. The Golay sequence according to various embodiments of the disclosure may be included in a channel estimation field (CEF) of the reference signal.

$$A_0(n) = \delta(n)$$

$$B_0(n) = \delta(n)$$

$$A_k(n) = W_k A_{k-1}(n) + B_{k-1}(n-D_k)$$

$$B_k(n) = W_k A_{k-1}(n) - B_{k-1}(n-D_k) \qquad \text{Equation 1}$$

In Equation 1, k may mean an iteration number, and k=1, 2, . . . , N (integer). Here, n=0, 1, . . . , $2^{N-1}$. In Equation 1, $D_k$ and $W_k$ may mean a seed vector for generating a Golay sequence. $D_k=2^{Pn}$, and Pn may mean a sequence of $\{0, 1, \ldots, N\}$. For example, in a case of generating a Golay sequence of length 128, $D_k$ may be [1, 8, 2, 4, 16, 32, 64] (k=1,2,3,4,5,6,7), and $W_k$ may be [−1 −1 −1 −1 +1 −1 −1]. In Equation 1, $\delta(n)$ is a Dirac delta function, and may have a value of 1 when n=0, and a value of 0 when n≠0. In Equation 1, $A_k(n)$ and $B_k(n)$ may be 0 in a range of n<0 and n≥$2^k$. The transmitting device 200 according to various embodiments of the disclosure may generate a Golay sequence as shown in FIG. 3B using $D_k$ and $W_k$. $A_k(n)$ and $B_k(n)$ may mean elements included in a Golay sequence A and a Golay sequence B, respectively.

The receiving device 210 according to various embodiments of the disclosure may include at least one terminal (e.g., the electronic device 101). The receiving device 210 according to various embodiments of the disclosure may include a Golay correlation module 212. The Golay correlation module 212 according to various embodiments of the disclosure may perform auto-correlation on a Golay sequence (e.g., the Golay A sequence) included in a signal transmitted from the transmitting device 200. A result value of auto-correlation according to various embodiments of the disclosure may be obtained by performing cross-correlation on the Golay A sequence as expressed in Equation 2.

$$x(n) = \sum_{i=1}^{128} s_a(n+i-1) \times Ga128(i) \quad \text{Equation 2}$$

In Equation 2, x(n) may mean a result of cross-correlation, n=0, 1, ..., $2^{N-1}$, $s_a$ may mean a sequence in which 128 0s (zeros) are added in front of and at the rear of a Golay A sequence, and Ga128(i) may mean a Golay A sequence of length 128. In FIG. 3C, an auto-correlation result for a Golay A sequence of length 128 is shown. The Golay correlation module 212 according to various embodiments of the disclosure may perform auto-correlation on a Golay sequence (e.g., a Golay B sequence) included in a signal transmitted from the transmitting device 200. A result value of auto-correlation according to various embodiments of the disclosure may be obtained by performing cross-correlation on the Golay B sequence as expressed in Equation 3.

$$x(n) = \sum_{i=1}^{128} s_a(n+i-1) \times Gb128(i) \quad \text{Equation 3}$$

In Equation 3, x(n) may mean a result of cross-correlation, n=0, 1, ..., $2^{N-1}$, $s_a$ may mean a sequence in which 128 '0's (zeros) are added in front of and at the rear of a Golay A sequence, and Gb128(i) may mean a Golay B sequence of length 128. In FIG. 3D, an auto-correlation result for a Golay B sequence of length 128 is shown. A receiving device 210 (e.g., a Golay correlation module 212) according to various embodiments of the disclosure may calculate a sum of a result of auto-correlation for a Golay A sequence and a result of auto-correlation for a Golay B sequence. In FIG. 3E, a sum of a result of auto-correlation for a Golay A sequence and a result of auto-correlation for a Golay B sequence is exemplarily shown. A receiving device 210 according to various embodiments of the disclosure may perform channel estimation using the Golay A sequence and the Golay B sequence which are in a complementary pair relationship.

Figure 4:
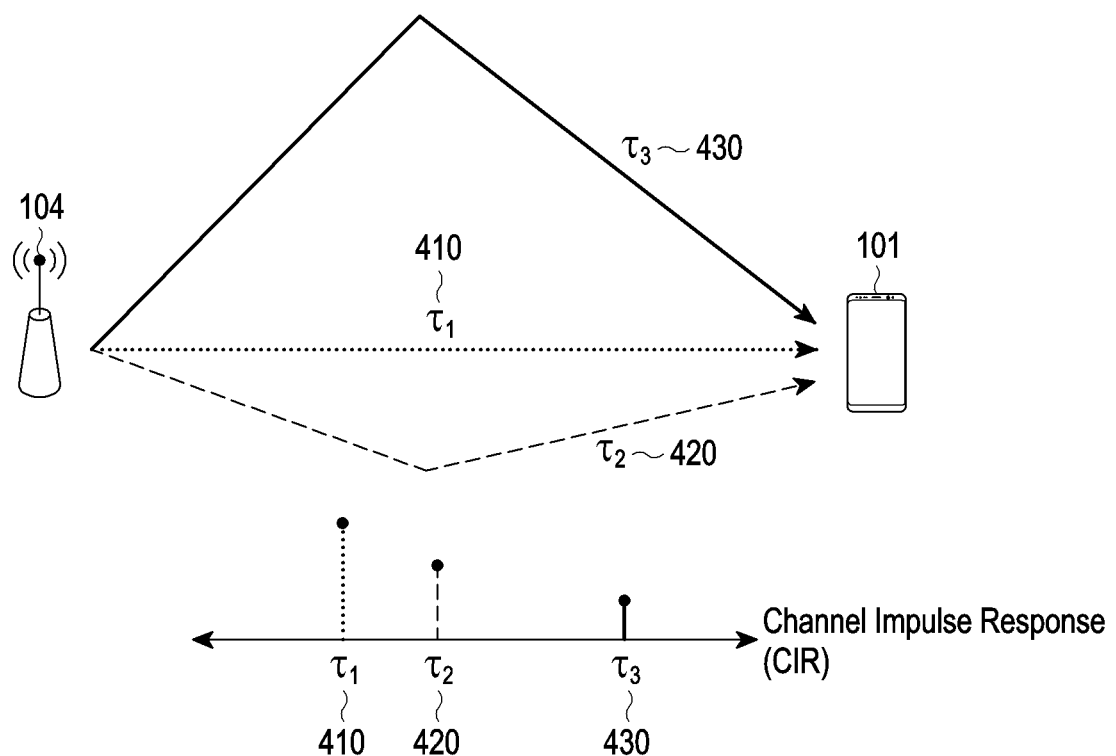
FIG. 4 is a diagram for describing a channel estimating method according to an embodiment of the disclosure.

FIG. 4 is a diagram for describing a channel estimating method according to an embodiment of the disclosure.

Referring to FIG. 4, an electronic device 101 may receive a signal from an external electronic device 104 through a plurality of paths (e.g., a first path 410, a second path 420, and a third path 430). The electronic device 101 according to various embodiments of the disclosure may calculate a sum of auto-correlation values (e.g., a channel impulse response) for Golay sequences included in a signal received through the plurality of paths. The electronic device 101 according to various embodiments of the disclosure may estimate a path through which the signal is transmitted based on the sum of the auto-correlation values for the Golay sequences. The electronic device 101 according to various embodiments of the disclosure may estimate a path having the largest magnitude of the channel impulse response as the first path 410. The electronic device 101 according to various embodiments of the disclosure may estimate a path having the second largest magnitude of the channel impulse response as the second path 420. The electronic device 101 according to various embodiments of the disclosure may estimate a path having the smallest magnitude of the channel impulse response as the third path 430.

Figure 5:
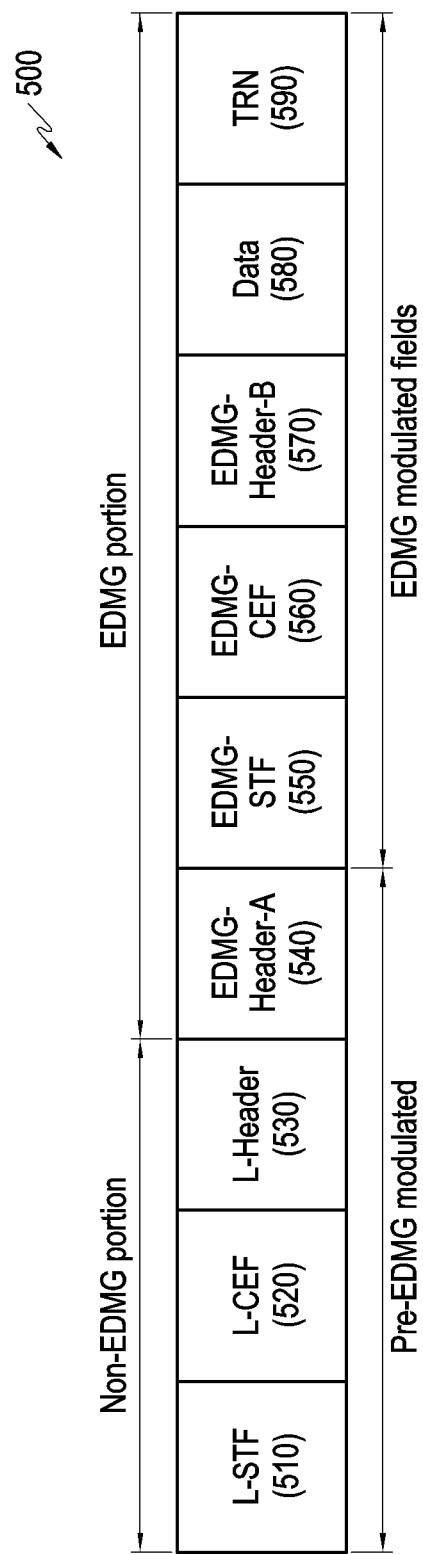
FIG. 5 is a diagram for describing a physical layer (PHY) protocol data unit (PPDU) according to an embodiment of the disclosure.

FIG. 5 is a diagram for describing a physical layer (PHY) protocol data unit (PPDU) 500 according to an embodiment of the disclosure.

Referring to FIG. 5, an electronic device (e.g., an electronic device 101 of FIG. 1) may output a signal of a PPDU format to an external electronic device (e.g., an external electronic device 104 of FIG. 1). A signal of a PPDU format according to various embodiments of the disclosure may include at least one field of a legacy shot training field (L-STF) 510, a legacy channel estimation field (L-CEF) 520, a legacy (L)-Header field 530, an enhanced directional multi gigabit (EDMG)-Header-A field 540, an EDMG-shot training field (STF) 550, an EDMG-channel estimation field (CEF) 560, an EDMG-Header-B field 570, a data field 580, or a training (TRN) field 590. At least one field according to various embodiments of the disclosure may be selectively included in a PPDU according to a type of the PPDU (e.g., an SU PPDU and an MU PPDU). According to various embodiments of the disclosure, a region including the L-STF 510, the L-CEF 520, and the L-Header field 530 may be referred to as a non-EDMG portion. The L-STF 510, the L-CEF 520, the L-Header field 530, and the EDMG-Header-A field 540 according to various embodiments of the disclosure may referred to as pre-EDMG modulated fields. The EDMG-STF 550, the EDMG-CEF 560, the EDMG-Header-B field 570, the data field 580, and the TRN field 590 according to various embodiments of the disclosure may be referred to as EDMG modulated fields. According to various embodiments of the disclosure, each field may be described as shown in Table 1.

TABLE 1

| Field | Description |
| --- | --- |
| L-STF | Non-EDMG Short Training field |
| L-CEF | Non-EDMG Channel Estimation field |
| L-Header | Non-EDMG Header field |
| EDMG-Header-A | EDMG Header A field |
| EDMG-STF | EDMG Short Training field |
| EDMG-CEF | EDMG Channel Estimation field |
| EDMG-Header-B | EDMG Header B field |
| Data | The Data field carries the PSDU(s) |
| TRN | Training sequences field |

Figure 6:
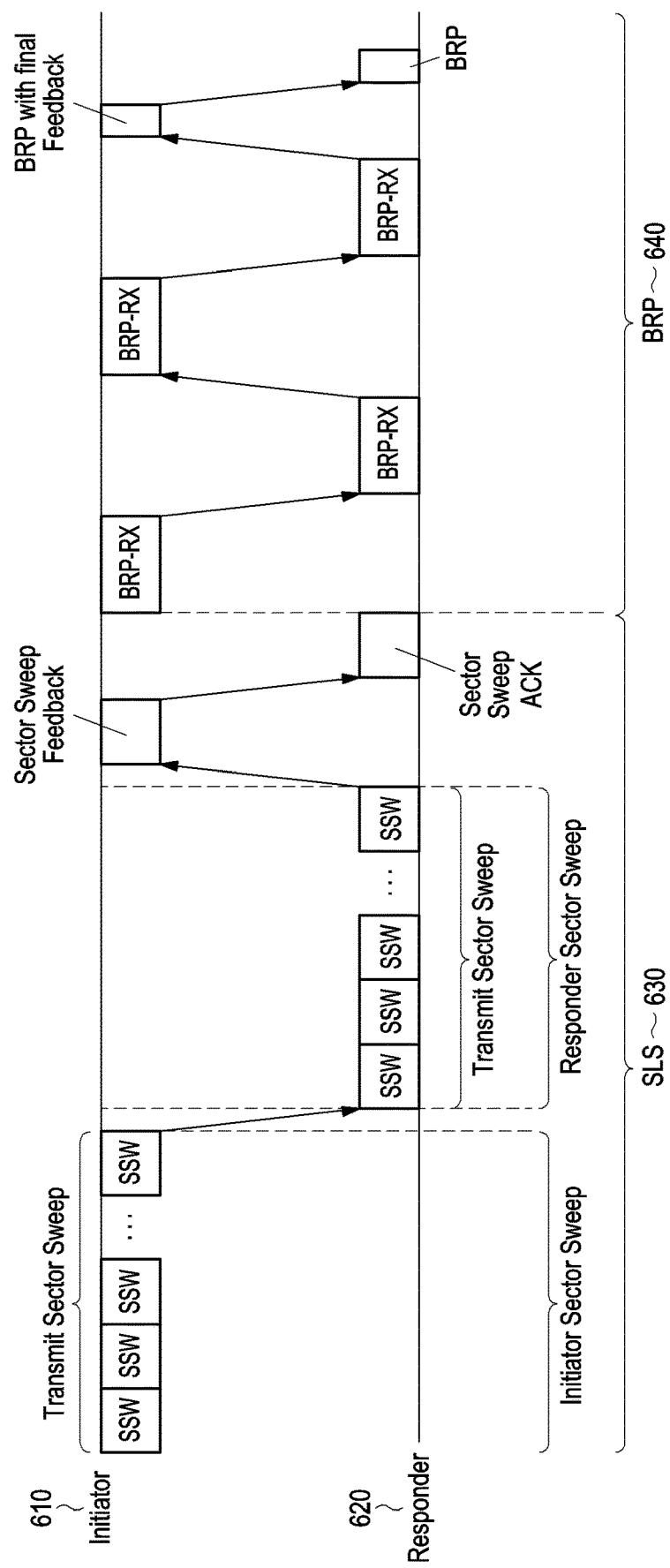
FIG. 6 is a diagram for describing a beam forming training process according to an embodiment of the disclosure.

FIG. 6 is a diagram for describing a beam forming training process according to an embodiment of the disclosure.

Referring to FIG. 6, in beam forming training occurring in association beamforming training (A-BFT) allocation, an access point (AP) or a personal basic service set central point/access point (PCP)/AP may be an initiator 610, and a non-AP and a non-PCP/AP station (STA) may be a responder 620. According to various embodiments of the disclosure, in beam forming training occurring in a service period (SP) allocation, a source (EDMG) STA of an SP may be the initiator 610, and a destination STA of the SP may be the responder 620. According to various embodiments of the disclosure, in beam forming training in transmission opportunity (TXOP) allocation, a TXOP holder may be the initiator 610 and a TXOP responder may be the responder 620. A link from an initiator to a responder according to various embodiments of the disclosure may be referred to as an initiator link. A link from the responder to the initiator according to various embodiments of the disclosure may be referred to as a responder link.

Beam forming training according to various embodiments of the disclosure may start from a Sector Level Sweep (SLS) 630 phase. A purpose of the SLS 630 phase according to various embodiments of the disclosure may be to enable a plurality of STAs to communicate at a control PHY rate or a higher modulation and coding scheme (MCS). For example, the SLS 630 phase may mean a beam training scheme in which network nodes continuously transmit and receive a frame including the same information while changing only a direction of a beam, and select a beam direction of which an indicator (e.g., a signal to ratio (SNR) or a received signal strength indicator (RSSI)) indicating a performance of a reception channel link is best among successfully received frames. According to various embodiments of the disclosure, a beam refinement protocol or beam refinement phase (BRP) 640 phase may be performed following the SLS 630 phase when requested by an initiator or a responder. The BRP 640 phase according to various embodiments of the disclosure may mean a protocol for finely adjusting a beam direction capable of maximizing a data transmission rate in a beam direction which is determined by the SLS 630 phase or other means. The BRP 640 phase according to various embodiments of the disclosure may be performed if necessary. According to various embodiments of the disclosure, beam training may be performed using a BRP frame which includes beam training information and information which reports a training result, defined for a BRP protocol. In the SLS 630 phase according to various embodiments of the disclosure, an initiator sector sweep (ISS) for training an initiator link, a response sector sweep (RSS) for training a responder link, SSW feedback, and SSW acknowledgment (ACK) may be included. According to various embodiments of the disclosure, the initiator 610 may initiate the SLS 630 phase by transmitting frames of the ISS to a responder. The responder 620 according to various embodiments of the disclosure may not initiate transmission of a frame(s) of the RSS before the ISS is successfully completed. The initiator 610 according to various embodiments of the disclosure may not initiate the SSW feedback before the RSS phase is successfully completed. The responder 620 according to various embodiments of the disclosure may initiate transmission of SSW ACK for the initiator 610 after successful completion of the SSW feedback of the initiator 610. According to various embodiments of the disclosure, a beam forming frame transmitted by the initiator 610 during the SLS 630 phase may include a beacon frame, an SSW frame, and an SSW feedback frame. During the SLS 630 phase according to various embodiments of the disclosure, a beam forming frame transmitted by the responder 620 to the initiator 610 may include an SSW frame and an SSW ACK frame. According to various embodiments of the disclosure, if the initiator 610 and the responder 620 perform a transmit sector sweep (TXSS) during the SLS 630 phase, the initiator 610 and the responder 620 may possess their own transmit sectors. According to various embodiments of the disclosure, the initiator 610 and the responder 620 may not change transmit power during a sector sweep. Various embodiments according to various embodiments of the disclosure may be applied to a communication device which uses a millimeter wave (mmWave). An electronic device (e.g., an electronic device 101 of FIG. 1) according to various embodiments of the disclosure may include an electronic device which uses a communication scheme such as 802.11ay, 802.11ad and/or 802.11aj. The electronic device (e.g., the electronic device 101 of FIG. 1) according to various embodiments of the disclosure may include a device which has a communication module capable of performing a radar function based on a broadband such as 5G or ultra wide band (UWB). In addition, the electronic device (e.g., the electronic device 101 of FIG. 1) according to various embodiments of the disclosure may include a device which uses signals into which a code is inserted, and the code may detect a specific pattern of auto-correlation or cross-correlation. Various embodiments of the disclosure may also be performed in devices capable of performing a beam training operation with each other.

Figure 7:
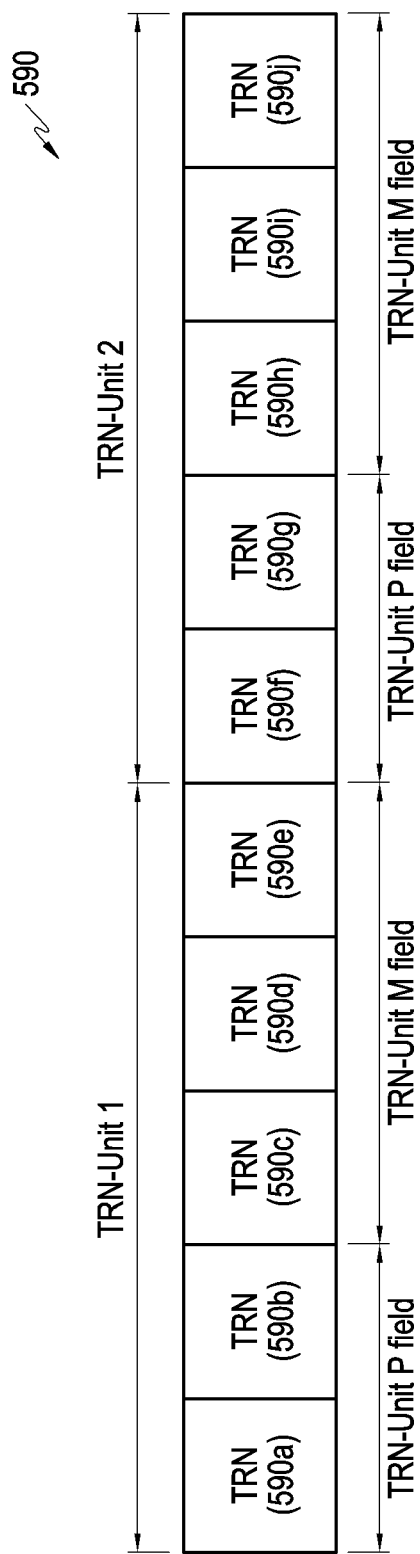
FIG. 7 is a diagram for describing a training (TRN) field according to an embodiment of the disclosure.

FIG. 7 is a diagram for describing a training (TRN) field according to an embodiment of the disclosure.

Figure 8:
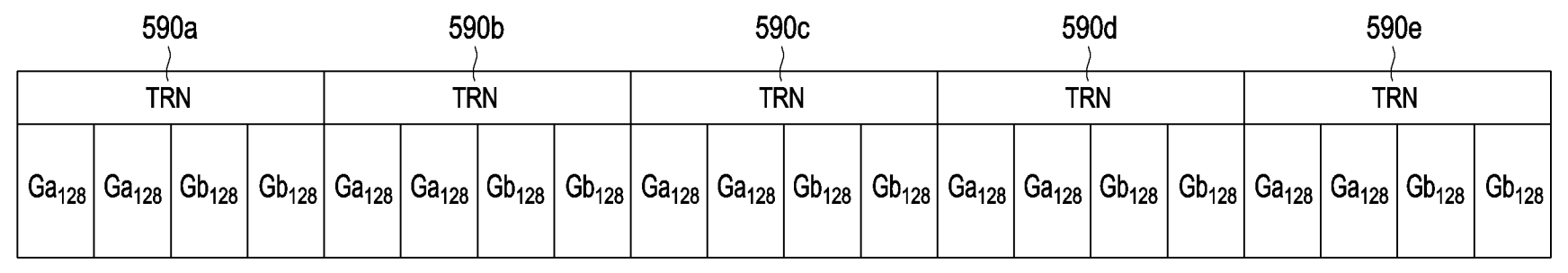

FIG. 8 is a diagram for describing information included in a TRN field according to an embodiment of the disclosure.

A PPDU (e.g., a PPDU 500 of FIG. 5) according to various embodiments of the disclosure may include a plurality of training fields 590*a* to 590*j*. The plurality of training fields 590*a* to 590*j* according to various embodiments of the disclosure may be divided into TRN-Units. A TRN-Unit according to various embodiments of the disclosure may include five TRN fields (e.g., training fields 590*a* to 590*e*), but this is exemplary. The TRN-Unit according to various embodiments of the disclosure may include a TRN-Unit P field and a TRN-Unit M field. The TRN-Unit P field according to various embodiments of the disclosure may include two training fields (e.g., training fields 590*a* and 590*b*), but this is exemplary. The TRN-Unit M field according to various embodiments of the disclosure may include three training fields (e.g., training fields 590*c* to 590*e*), but this is exemplary. As shown in FIG. 8, training fields (e.g., the training fields 590*a* to 590*e*) according to various embodiments of the disclosure may include information about a Golay sequence.

Figure 9:
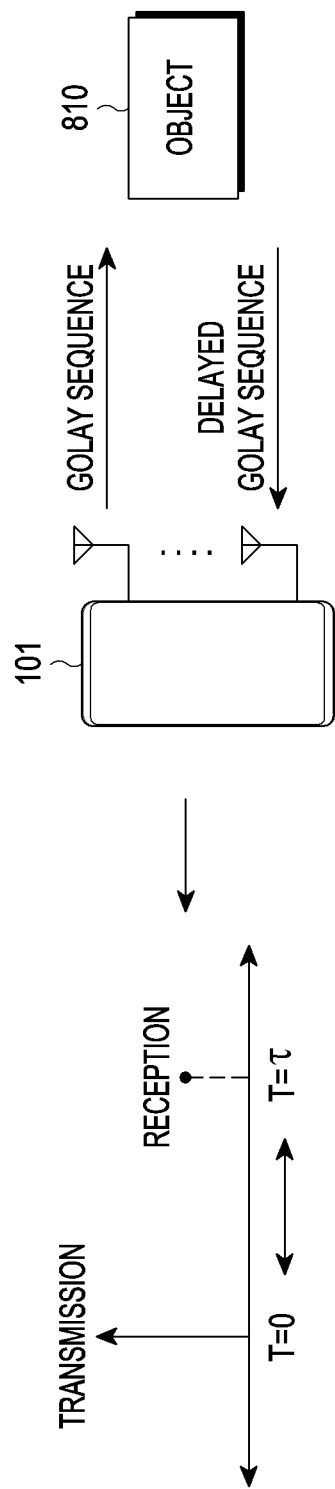
FIG. 9 is a diagram for describing an operation principle in which an electronic device performs a radar function according to an embodiment of the disclosure.

FIG. 9 is a diagram for describing an operation principle in which an electronic device performs a radar function according to an embodiment of the disclosure.

Referring to FIG. 9, an electronic device 101 according to various embodiments of the disclosure may output a signal (e.g., a PPDU 500 of FIG. 5) including a Golay sequence to the outside of the electronic device 101. The Golay sequence according to various embodiments of the disclosure may be included in, for example, a channel estimation field (e.g., an L-CEF 520 of FIG. 5). The electronic device 101 according to various embodiments of the disclosure may receive a reflection signal reflected from an object 810. The reflection signal according to various embodiments of the disclosure may be a signal delayed by a time $\tau$. The electronic device 101 (e.g., a Golay correlation module 212 of FIG. 3A) according to various embodiments of the disclosure may calculate an auto-correlation value (e.g., a channel impulse response) of a Golay sequence for the received reflection signal. The electronic device 101 (e.g., the Golay correlation module 212 of FIG. 3A) according to various embodiments of the disclosure may calculate the auto-correlation value (e.g., the channel impulse response) of the Golay sequence for the received reflection signal, and compare a peak value of an auto-correlation value for a signal at a time point at which the signal is output with a peak value of the auto-correlation value for the received reflection signal to identify the delay time $\tau$. According to various embodiments of the disclosure, when a speed of an electromagnetic wave is $v_{light}$, a distance, in which the electromagnetic wave travels for a period, may be $v_{light} \cdot \tau$. Here, the period is a period during which the electronic device 101 transmits the signal and the reflection signal that the signal transmitted from the electronic device 101 is reflected on the object 810 is received by the electronic device 101. The value $v_{light} \cdot \tau$ according to various embodiments of the disclosure corresponds to a distance in which the signal transmitted from the electronic device 101 travels to and from the object 810, it may be estimated that the object 810 is in a distance $$\frac{V_{light} \cdot \tau}{2}$$

from the electronic device 101. According to various embodiments of the disclosure, the electronic device 101 may identify a distance from the object 810 using a specific signal (e.g., the PPDU 500 of FIG. 5). In the disclosure, for convenience of description, a function or operation for calculating the distance from the object 810, or a function or operation for recognizing a gesture or parts of a body (e.g., a face) is briefly referred as "radar function." According to various embodiments of the disclosure, a first signal (e.g., a radar signal) and a second signal (e.g., a signal for data transmission and reception) may be signals included in the same frequency band (e.g., a frequency band from 6 GHz to 300 GHz). According to various embodiments of the disclosure, the first signal and the second signal may be transmitted and received using different frequency bands. The first signal according to various embodiments of the disclosure may include at least one field of EDMG-STF or EDMG-CEF.

Figure 10A:
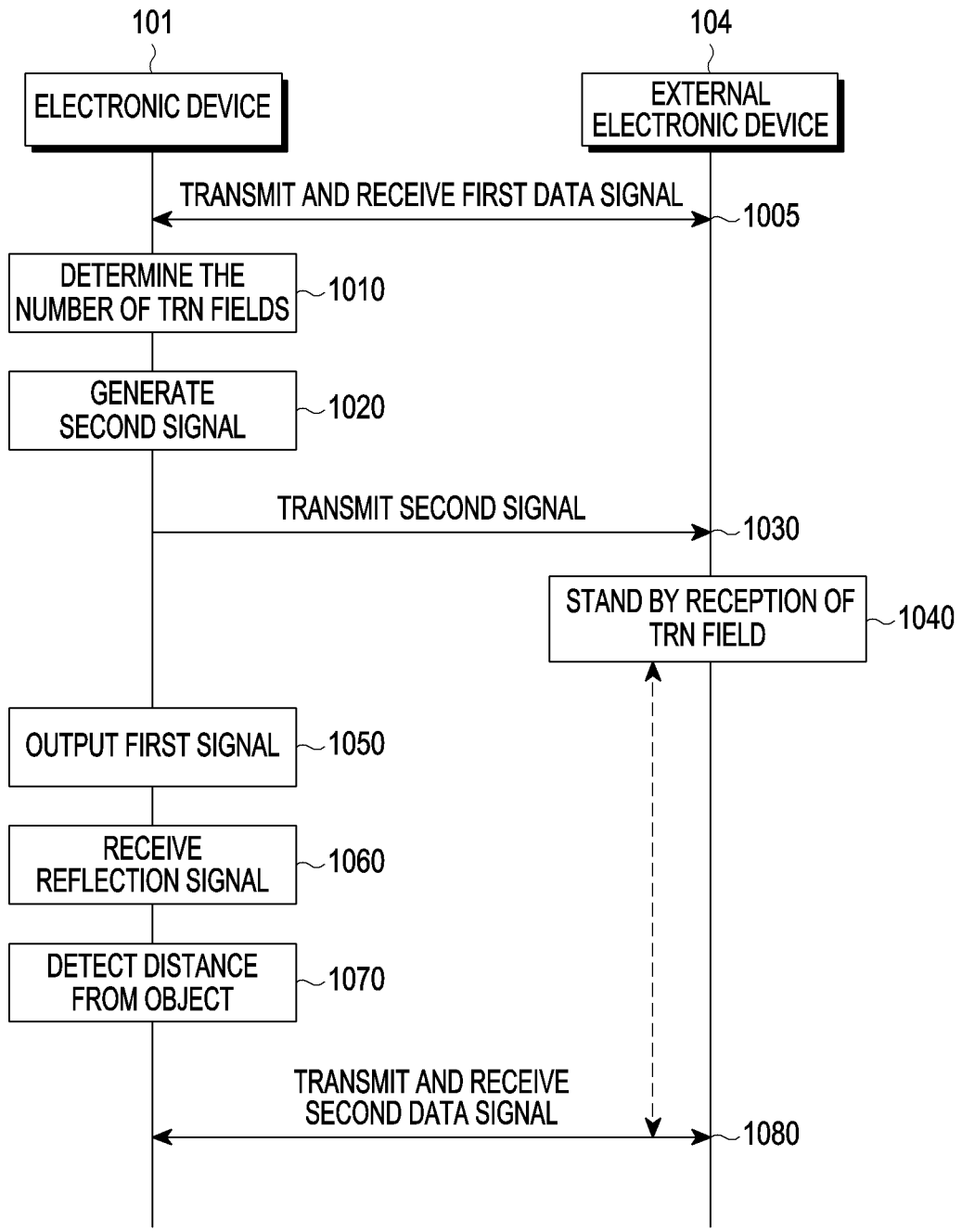
FIGS. 10A and 10B are diagrams for describing an operating method of an electronic device according to various embodiments of the disclosure.
Figure 10B:
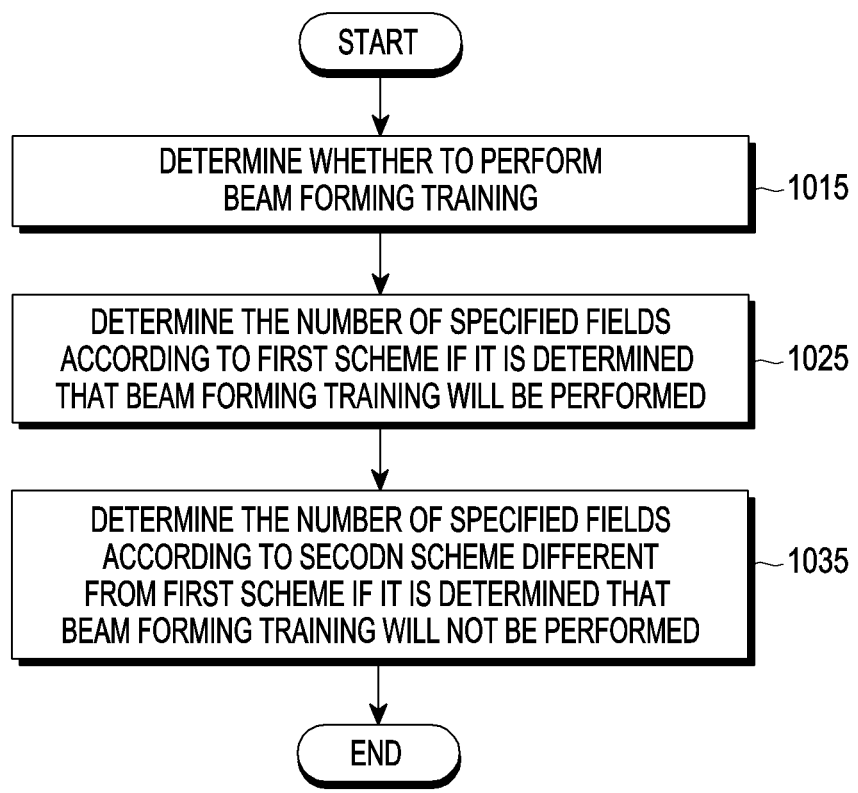

FIGS. 10A and 10B are diagrams for describing an operating method of an electronic device according to various embodiments of the disclosure.

Referring to FIG. 10A, an electronic device 101 according to various embodiments of the disclosure may transmit and receive a first data signal to and from an external electronic device 104 in operation 1005. The first data signal according to various embodiments of the disclosure may include a data signal transmitted and received at specific time (e.g., a reception signal 910 and a transmission signal 920 of FIG. 12). The "specific time" according to various embodiments of the disclosure may include, for example, time reserved for the electronic device 101 to perform a transmitting and receiving operation with the external electronic device 104.

The electronic device 101 according to various embodiments of the disclosure, in operation 1010, may determine the number of training fields (e.g., a training field of FIG. 5) according to a pre-specified period or a specified condition (e.g., running of application related to transmission and reception of a radar signal). The electronic device 101 according to various embodiments of the disclosure may determine the number of training fields using Equation 4. In the disclosure, a scheme of determining the number of training fields by Equation 4 may be referred to as a first scheme. More specifically, the electronic device 101 according to various embodiments of the disclosure may use time for performing beam training as transmission and reception time of a first signal in order to reserve the transmission and reception time of the first signal. For this, the electronic device 101 according to various embodiments of the disclosure may set time which corresponds to the number of the training fields (e.g., the TRN field 590 of FIG. 2) as the transmission and reception time of the first signal. The electronic device 101 according to various embodiments of the disclosure may include the number of the training fields which is determined according to Equation 4 into a header (e.g., an EDMG Header-A field 540 or an EDMG Header-B field 570 of FIG. 5), but may not actually transmit the number of training fields to the external electronic device 104. The electronic device 101 according to various embodiments of the disclosure may determine the number of training fields in order to secure time for transmitting and receiving the first signal.

$$\left\lceil \frac{T_{radar}}{T_{TRN}} \right\rceil \quad \text{Equation 4}$$

In Equation 4, $T_{radar}$ may mean time required for transmitting and receiving a radar signal. $T_{radar}$ according to various embodiments of the disclosure may be, for example, 727 nano second (ns), but this is exemplary. A value of $T_{radar}$ according to various embodiments of the disclosure may be predetermined. In Equation 4, $T_{TRN}$ may mean a duration of a TRN unit. In Equation 4, [ ] may mean a ceiling calculation, for example, [x] may mean a minimum integer which is greater than x. According to various embodiments of the disclosure, the duration of the TRN unit may be determined by Equation 5.

$$T_{TRN} = 49921(1.76*10^3) \mu s \quad \text{Equation 5}$$

Alternatively, the electronic device 101 according to various embodiments of the disclosure may determine the duration of the TRN unit using Equation 6.

$$T_{TRN} = \left( \begin{array}{c} L_T + \\ (L_{TRN-Unit-P} + L_{TRN-Unit-M}) \times \\ \text{TRN\_BASIC\_LENGTH} + \\ L_{TRN-Unit-P} \times \text{TRN\_BASIC\_LENGTH} \end{array} \right) \Big/ (1.76 \times 10^3)_{\mu s} \quad \text{Equation 6}$$

In Equation 6, LT may be determined by Equation 7. In Equation 6, LTRN-Unit-P may have an integer value of 0, 1, 2, or 4. In Equation 6, LTRN-Unit-M may have an integer value of 1 to 16. In Equation 6, TRN_BASIC_LENGTH may be determined by Equation 8.

$$L_T = 6 \times 256 \times N_{TRN}^{NTX} \quad \text{Equation 7}$$

$$\text{TRN\_BASIC\_LENGTH} = 6 \times TRN\_BL \times N_{TRN}^{NTX} \quad \text{Equation 8}$$

In Equations 7 and 8, $N_{TRN}^{NTX}$ my is a parameter determined according to the number of transmission chains used for transmitting a PPDU, and may have an integer of 1 to 8. In Equation 8, TRN_BL may mean length (e.g., 64, 128, and 256) of a Golay sequence used in a TRN sub-field. According to various embodiments of the disclosure, a value of EDMG_TRN_LEN may be transmitted from the external electronic device 104 or may be specified by the electronic device 101.

The electronic device 101 according to various embodiments of the disclosure may perform beam forming training according to a beam tracking request from the external electronic device 104. Upon receiving the beam tracking request, the electronic device 101 according to various embodiments of the disclosure may determine the number of training fields according to Equation 9. In the disclosure, a scheme of determining the number of training fields by Equation 9 may be referred to as a second scheme.

$$N_{TRN} + \left\lceil \frac{T_{radar}}{T_{TRN}} \right\rceil \quad \text{Equation 9}$$

In Equation 9, $N_{TRN}$ may mean the number of training fields required for beam forming training. Information about $N_{TRN}$ according to various embodiments of the disclosure may be received from the external electronic device 104 or determined by the electronic device 101.

The electronic device 101 according to various embodiments of the disclosure may determine the number of training fields according to various schemes in relation to operation 1010. For example, referring to FIG. 10B, the electronic device 101 according to various embodiments of the disclosure may determine whether to perform beam forming training in operation 1015. Upon determining that beam forming training will not be performed, the electronic device 101 according to various embodiments of the disclosure, in operation 1025, may determine the number of specified fields (e.g., a training field) according to a first scheme. Upon determining that beam forming training will be performed, the electronic device 101 according to various embodiments of the disclosure, in operation 1035, may determine the number of specified fields (e.g., the training field) according to a second scheme different from the first scheme.

The electronic device 101 according to various embodiments of the disclosure may generate a second signal in operation 1020. In various embodiments of the disclosure, the second signal may mean a signal transmitted to the external electronic device 104 for data transmission. The electronic device 101 according to various embodiments of the disclosure may generate the second signal by including information about the determined number of training fields into a header field (e.g., an EDMG Header-A field 540 or an EDMG Header-B field 570 of FIG. 5) to be output to the external electronic device 104. Upon transmitting the second signal to the external electronic device 104, the electronic device 101 according to various embodiments of the disclosure may add (e.g., insert) only a field for beam forming training according to a beam tracking request to the second signal to transmit the second signal to the external electronic device 104. In other words, a training field according to the number of training fields calculated according to Equation 4 may not actually be added to the second signal. In the disclosure, a training field which is not actually added to the second signal (e.g., a second signal 1100 of FIG. 11A) may be referred to as the term "virtual training field." In the disclosure, the term "virtual training field" or "information about a virtual training field" may also be interchangeably/alternatively referred to "a time interval for transmitting and receiving a radar signal."

The electronic device 101 according to various embodiments of the disclosure may transmit the second signal to the external electronic device 104 in operation 1030.

The external electronic device 104 according to various embodiments of the disclosure may, in operation 1040, enter a reception standby state of a training field according to reception of the second signal. The external electronic device 104 according to various embodiments of the disclosure may receive a data field (e.g., the data field 580 of FIG. 5) according to the information about the number of training fields included in the second signal (e.g., the EDMG Header-A field 540 or the EDMG Header-B field 570 of FIG. 5), and then enter the reception standby state of the training field.

The electronic device 101 according to various embodiments of the disclosure may output a first signal in operation 1050. The first signal according to various embodiments of the disclosure may mean a signal for executing a radar function. The first signal according to various embodiments of the disclosure may be a signal in which information about a Golay sequence is included in a channel estimation field (e.g., an L-CEF 520 of FIG. 5), and null data is included in at least one other field. Alternatively, the first signal according to various embodiments of the disclosure may have various structures which may use an auto-correlation characteristic of the Golay sequence, and, for example, a TRN unit may be used as the first signal.

The electronic device 101 according to various embodiments of the disclosure may receive a reflection signal for the first signal in operation 1060. The electronic device 101 according to various embodiments of the disclosure may detect a distance from an object in operation 1070 according to an operation as described in FIG. 9.

The electronic device 101 according to various embodiments of the disclosure may transmit and receive a second data signal to and from the external electronic device 104 in operation 1080. The second data signal according to various embodiments of the disclosure may include a data signal (e.g., the reception signal 910 and the transmission signal 920 of FIG. 12) transmitted and received at specific time.

Figure 11A:
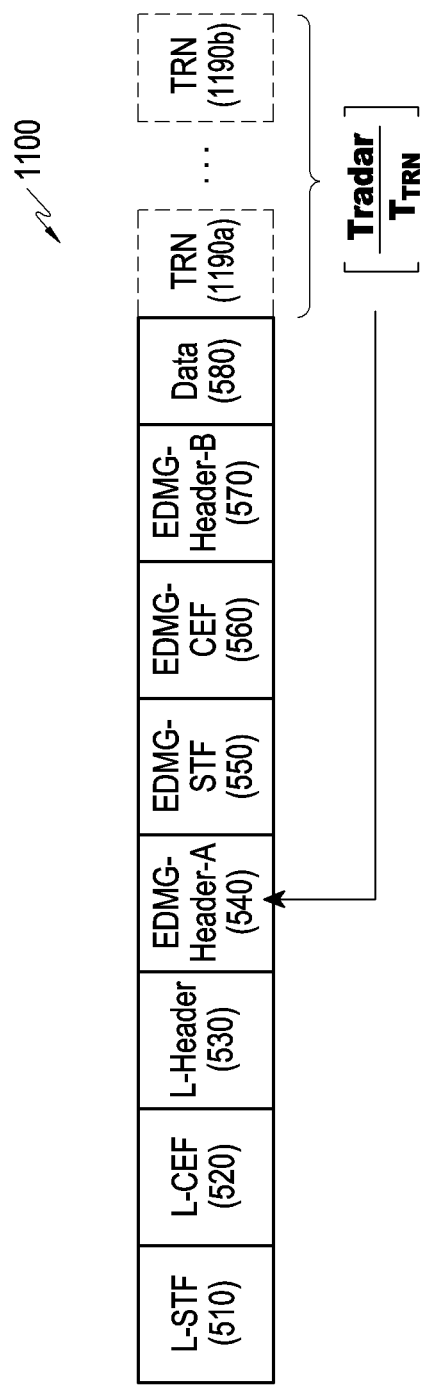
FIGS. 11A and 11B are diagrams for describing a second signal generated by an electronic device according to various embodiments of the disclosure.
Figure 11B:
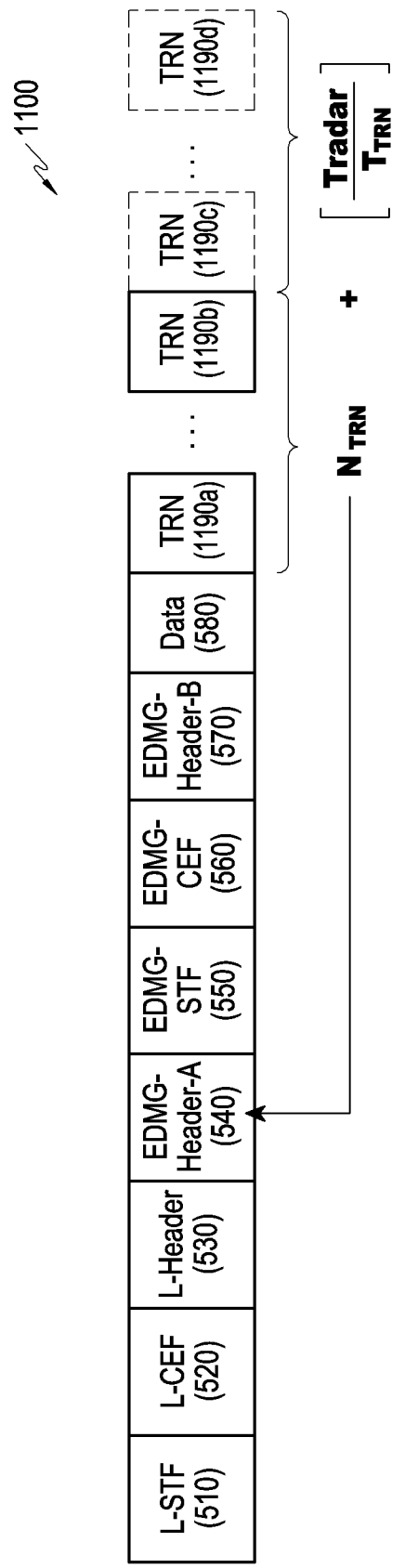

FIGS. 11A and 11B are diagrams for describing a second signal generated by an electronic device according to various embodiments of the disclosure.

Referring to FIG. 11A, information about a training field determined according to a first scheme according to various embodiments of the disclosure may be included in a header field (e.g., an EDMG Header-A field 540 or an EDMG Header-B field 570) of a signal to be transmitted to an external electronic device (e.g., an external electronic device 104 of FIG. 1). According to various embodiments of the disclosure, if a second signal 1100 is transmitted to the external electronic device (e.g., an external electronic device 104 of FIG. 1), a training field (e.g., a training field 1190*a* to a training field 1190*b*) which corresponds to the number of training fields determined according to a first scheme may not actually be added to the second signal 1100. In other words, only information about the number of training fields is included in a header field (e.g., the EDMG Header-A field 540 or the EDMG Header-B field 570) of the second signal 1100, and the training field (e.g., the training field 1190*a* to the training field 1190*b*) which corresponds to the number of training fields may not actually be added to the second signal 1100. So, after receiving the second signal 1100, the external electronic device (e.g., the external electronic device 104 of FIG. 1) may receive a data field and transit into (e.g., enter) a reception standby state of the training field.

Referring to FIG. 11B, information about a training field determined according to a second scheme according to various embodiments of the disclosure may be included in a header field (e.g., an EDMG Header-A field 540 or an EDMG Header-B field 570) of a signal to be transmitted to an electronic device. According to various embodiments of the disclosure, if a second signal 1100 is transmitted to an external electronic device (e.g., an external electronic device 104 of FIG. 1), a specified training field (e.g., a training field 1190*c* to a training field 1190*d*) among training fields which correspond to the number of training fields determined according to a second scheme may not actually be added to the second signal 1100. The specified training field according to various embodiments of the disclosure may mean a training field which corresponds to the number of training fields determined according to a first scheme. So, upon receiving the second signal 1100, the external electronic device (e.g., the external electronic device 104 of FIG. 1) may receive a training field (e.g., a training field 1190*a* to a training field 1190*b*) required to actually perform beam forming training, and then transit into (e.g., enter) a reception standby state of the training field during specified time (e.g., time required for a training field 1190*c* to a training field 1190*d*).

Figure 12:
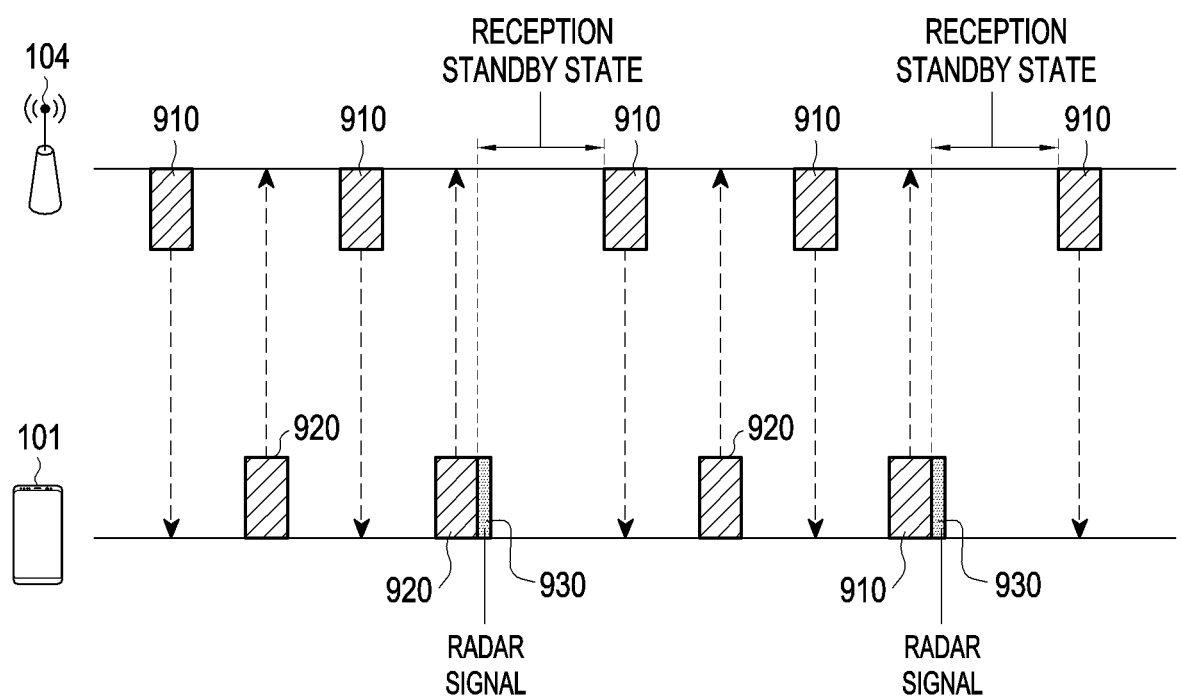
FIG. 12 is a diagram for describing an operation in which a radar signal is transmitted and received according to an embodiment of the disclosure.

FIG. 12 is a diagram for describing an operation in which a radar signal is transmitted and received according to an embodiment of the disclosure.

Referring to FIG. 12, an electronic device (e.g., an electronic device 101 of FIG. 1) according to various embodiments of the disclosure may add information about a virtual training field (e.g., information about a time interval during which a radar signal will be transmitted and received) to a data signal (e.g., a reception signal 910 and a transmission signal 920) transmitted and received for a data communication, and transmit the data signal to an external electronic device (e.g., an external electronic device 104 of FIG. 1), thereby the external electronic device (e.g., the external electronic device 104 of FIG. 1) may transit into a reception standby state for a training field. The electronic device 101 according to various embodiments of the disclosure may transmit and receive a radar signal without affecting transmission of a data signal (e.g., a transmission signal 920) by transmitting and receiving the radar signal during the reception standby state of the training field. A radar signal 930 for performing a radar function according to various embodiments of the disclosure may be transmitted and received while the external electronic device 104 is on the reception standby state for the training field.

Figure 13A:
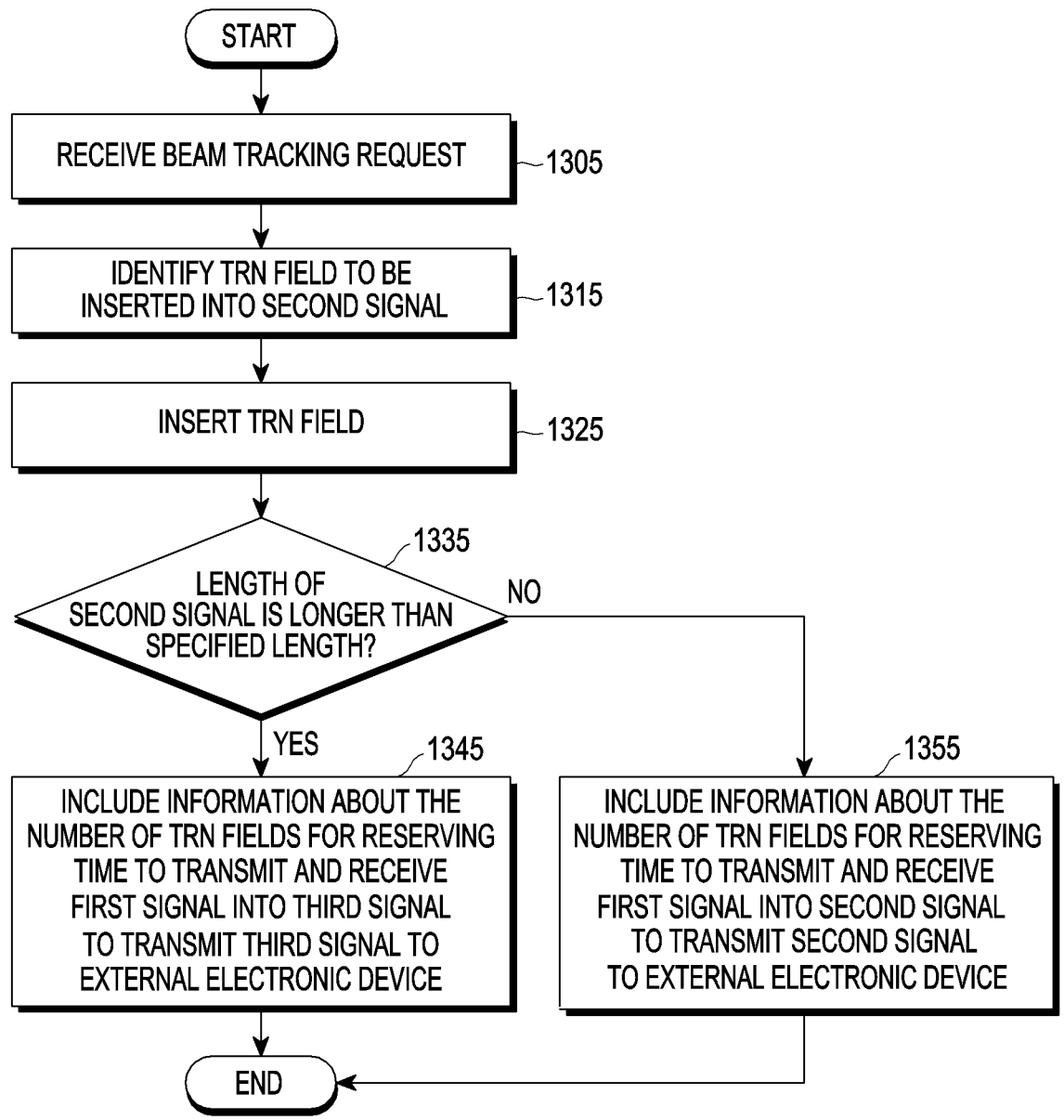
FIGS. 13A and 13B are diagrams for describing an operation in which information about the number of training fields calculated is included in a third signal which is output after output of a second signal, and the third signal is transmitted to an external electronic device in a case that length of the second signal is longer than threshold length according to various embodiments of the disclosure.
Figure 13B:
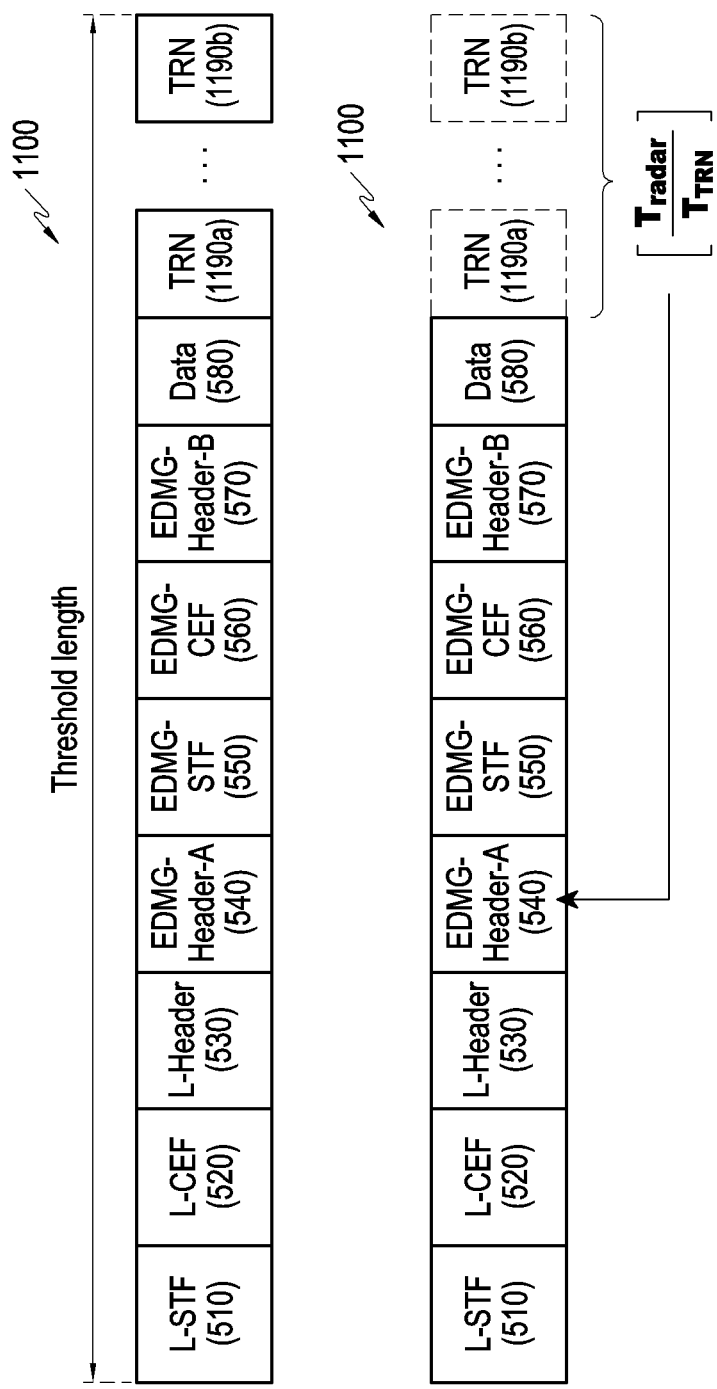

FIGS. 13A and 13B are diagrams for describing an operation in which information about the number of training fields calculated is included in a third signal which is output after output of a second signal, and the third signal is transmitted to an external electronic device in a case that length of the second signal is longer than threshold length according to various embodiments of the disclosure.

Referring to FIG. 13A, an electronic device (e.g., an electronic device 101 of FIG. 1) according to various embodiments of the disclosure may receive a beam tracking request in operation 1305. The beam tracking request according to various embodiments of the disclosure may be transmitted from an external electronic device (e.g., an external electronic device 104 of FIG. 1). According to various embodiments of the disclosure, the electronic device 101 may perform beam training by determining a beam training time point without the beam tracking request from the external electronic device (e.g., the external electronic device 104 of FIG. 1). In this case, the electronic device 101 according to various embodiments of the disclosure may simultaneously perform a beam training function or operation and a radar function or operation.

The electronic device (e.g., the electronic device 101 of FIG. 1) according to various embodiments of the disclosure, in operation 1315, may identify a training field to be inserted into a second signal (e.g., a second signal 1100 of FIG. 11A). According to various embodiments of the disclosure, information (e.g., $N_{TRN}$) about the number of training fields to be inserted into the second signal (e.g., the second signal 1100 of FIG. 11A) may be transmitted from the external electronic device (e.g., the external electronic device 104 of FIG. 1). The electronic device according to various embodiments of the disclosure (e.g., the electronic device 101 of FIG. 1) may identify the training field to be inserted into the second signal (e.g., the second signal 1100 of FIG. 11A) according to a second scheme.

The electronic device according to various embodiments of the disclosure (e.g., the electronic device 101 of FIG. 1) may insert the training field into the second signal (e.g., the second signal 1100 of FIG. 11A) in operation 1325.

The electronic device according to various embodiments of the disclosure (e.g., the electronic device 101 of FIG. 1) may determine whether a length of the second signal is longer than a specified length (e.g., a threshold length) due to the insertion of the training field in operation 1335.

The electronic device according to various embodiments of the disclosure (e.g., the electronic device 101 of FIG. 1), in operation 1345 (operation 1335—YES), may insert information about the number of training fields for reserving time for transmitting and receiving the first signal into a third signal, and transmit the third signal to the external electronic device (e.g., the external electronic device 104 of FIG. 1). The third signal according to various embodiments of the disclosure may mean a signal which is transmitted to the external electronic device (e.g., the external electronic device 104 of FIG. 1) as a signal (e.g., a frame) following the second signal after transmission of the second signal (e.g., the second signal 1100 of FIG. 11A).

Referring to FIG. 13B, at least one virtual training field may not be inserted into a second signal 1100 according to addition of a training field (e.g., a training field 1190a and a training field 1190b) according to various embodiments of the disclosure. In this case, an electronic device 101 according to various embodiments of the disclosure may include information about a virtual training field in a third signal to transmit the third signal to an external electronic device (e.g., an external electronic device 104 of FIG. 1). The electronic device according to various embodiments of the disclosure (e.g., the electronic device 101 of FIG. 1) may transmit and receive a radar signal after transmitting the third signal. In a case of embodiments as shown in FIGS. 13A and 13B, even if it is difficult to insert a virtual training field due to a constraint on length of a PPDU, an effect of securing transmission and reception of a radar signal may be obtained.

The electronic device (e.g., the electronic device 101 of FIG. 1) according to various embodiments of the disclosure, in operation 1355 (operation 1335-NO), may insert, into the second signal (e.g., the second signal 1100 of FIG. 11A), information about the number of training fields for reserving time for transmitting and receiving a first signal, and transmit the second signal to the external electronic device (e.g., the external electronic device 104 of FIG. 1).

Figure 14:
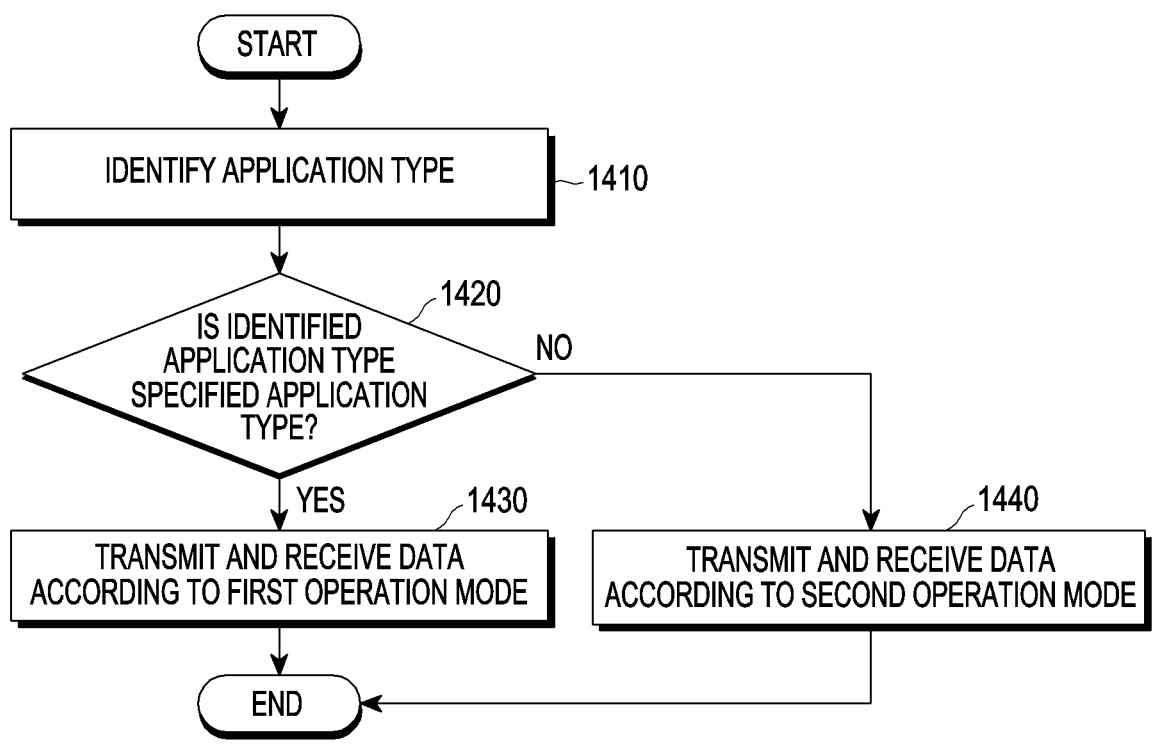
FIG. 14 is a diagram for describing an operation in which an electronic device identifies a type of an application and sets an operation mode of the electronic device differently according to the identified type of the application according to an embodiment of the disclosure.

FIG. 14 is a diagram for describing an operation in which an electronic device identifies a type of an application and sets an operation mode of the electronic device differently according to the identified type of the application according to an embodiment of the disclosure.

Referring to FIG. 14, an electronic device (e.g., an electronic device 101 of FIG. 1) according to various embodiments of the disclosure may identify a type of an application currently running on the electronic device in operation 1410.

The electronic device (e.g., the electronic device 101 of FIG. 1) according to various embodiments of the disclosure may determine whether the identified application type is a specified application type in operation 1420. A specified application according to various embodiments of the disclosure may include an application requiring low-latency, such as an ultra-high resolution video streaming application or a VR application. An application according to various embodiments of the disclosure may include an application in which a radar function or operation is used.

If the identified application type is the specified application type, the electronic device according to various embodiments of the disclosure (e.g., the electronic device 101 of FIG. 1), in operation 1430 (operation 1420—YES), may perform data transmission and reception according to a first operation mode. The first operation mode according to various embodiments of the disclosure may mean an operation mode in which time for transmitting and receiving a radar signal is reserved by inserting a virtual training field into a second signal (e.g., a second signal (PPDU 500) of FIG. 5).

If the identified application type is not the specified application type, the electronic device (e.g., the electronic device 101 of FIG. 1) according to various embodiments of the disclosure, in operation 1440 (operation 1420—NO), may perform data transmission and reception according to a second operation mode. The second operation mode according to various embodiments of the disclosure may mean a mode in which a virtual training field is not used. For example, the second operation mode may mean an operation mode for performing a radar function or operation according to a technology as illustrated in FIG. 2. For example, the second operation mode may mean an operation mode of reserving time for performing the radar function or operation using a management frame including a sector sweep (SSW) or clear to send (CTS) frame.

Figure 15:
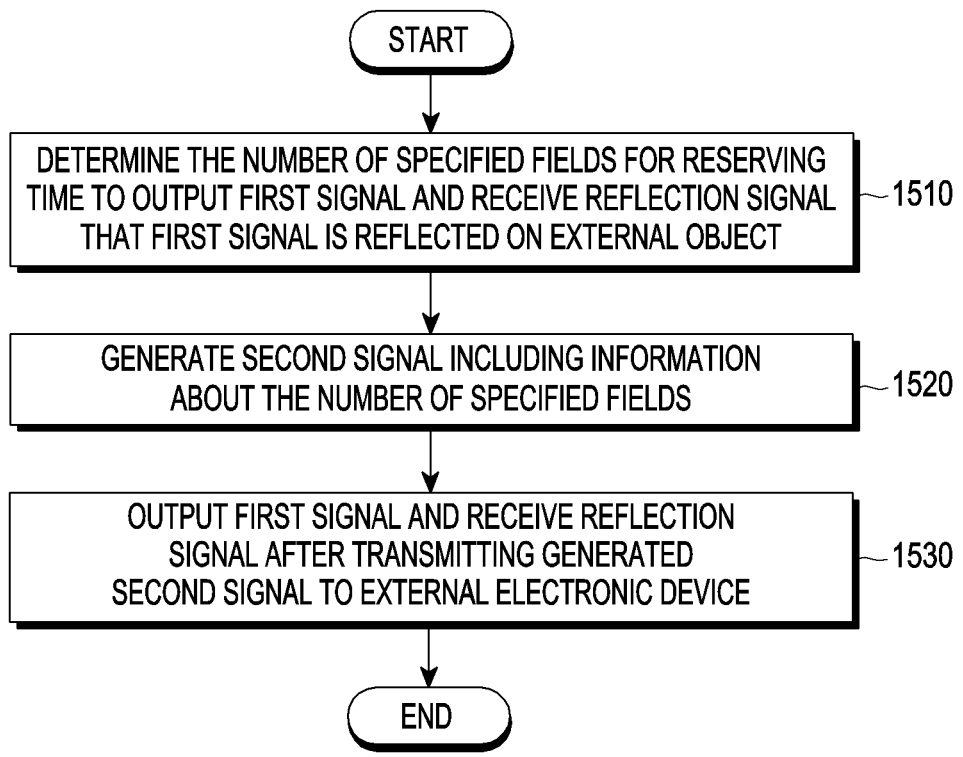
FIGS. 15 and 16 are diagrams for describing an operating method of an electronic device according to various embodiments of the disclosure.
Figure 16:
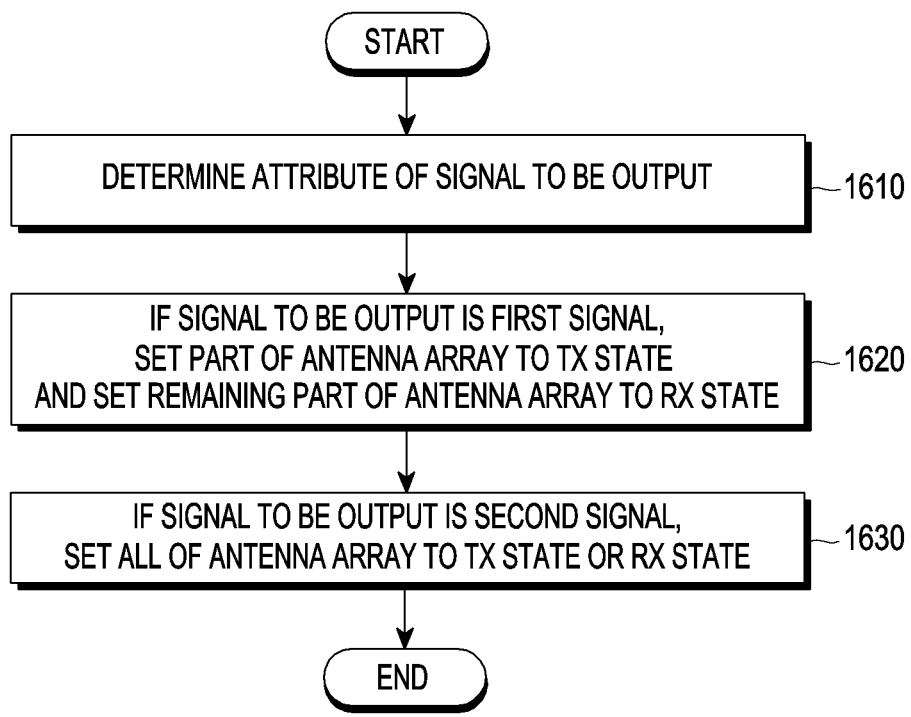

FIGS. 15 and 16 are diagrams for describing an operating method of an electronic device 101 according to various embodiments of the disclosure.

Referring to FIG. 15, an electronic device according to various embodiments of the disclosure, in operation 1510, may determine the number of specified fields for reserving time to output a first signal (e.g., a radar signal) and receive a reflection signal that the first signal is reflected on an external object.

The electronic device according to various embodiments of the disclosure may generate a second signal (e.g., a second signal (PPDU 500) of FIG. 5) including information about the number of specified fields in operation 1520.

The electronic device according to various embodiments of the disclosure may output the first signal after transmitting the generated second signal to an external electronic device, and then receive a reflection signal in operation 1530.

Referring to FIG. 16, an electronic device 101 according to various embodiments of the disclosure may determine an attribute of a signal to be output in operation 1610.

In operation 1620, if the signal to be output is a first signal, the electronic device 101 according to various embodiments of the disclosure may set a part of an antenna array to a transmission (Tx) state and a remaining part of the antenna array to a reception (Rx) state. An antenna array according to various embodiments of the disclosure may include an array antenna. In addition, the antenna array according to various embodiments of the disclosure may include at least one patch antenna or at least one dipole antenna (or other antennas). The electronic device 101 according to various embodiments of the disclosure may set a partial area of the antenna array to a Tx state in order to output the first signal (e.g., a radar signal). The electronic device 101 according to various embodiments of the disclosure may set a remaining area of the antenna array to an Rx state in order to receive a signal that the first signal is reflected.

If the signal to be output is a second signal, the electronic device 101 according to various embodiments of the disclosure, in operation 1630, may set all of the antenna array to a Tx state or an Rx state. The second signal (e.g., a second signal (PPDU 500) of FIG. 5) according to various embodiments of the disclosure may include a signal for transmitting data to an external electronic device 104.

An electronic device 101 according to various embodiments of the disclosure may include a device which provides virtual reality or a device which provides augmented reality. The electronic device 101 according to various embodiments of the disclosure may include a millimeter wave communication module. The electronic device 101 according to various embodiments of the disclosure may perform a communication with an external electronic device 104 (e.g., a base station). The electronic device 101 according to various embodiments of the disclosure may recognize (e.g., monitor) a user's gesture through a camera or a radar function of a millimeter wave while performing a communication with an external electronic device. The electronic device 101 according to various embodiments of the disclosure may sense movement of a part of a user's body (e.g., hands) through the camera during a communication using the millimeter wave. If the movement of the part of the user's body is sensed, the electronic device 101 according to various embodiments of the disclosure may perform an operation for sensing the movement of the part of the user's body through the operation illustrated in FIG. 10A. The electronic device 101 according to various embodiments of the disclosure may sense a position or the movement of the part of the user's body through the radar function. If the part of the user's body is located in a specific location on a virtual reality screen or an augmented reality screen, the electronic device 101 according to various embodiments of the disclosure may trace and/or sense the location or the movement of the part of the user's body based on a specific location. The electronic device 101 according to various embodiments of the disclosure may perform an operation for sensing the movement of the part of the user's body through the operation illustrated in FIG. 10A if a pre-specified gesture is sensed. The electronic device 101 according to various embodiments of the disclosure may perform the operation for sensing the movement of the part of the user's body through the operation illustrated in FIG. 10A if an application requires a specific gesture operation input while performing a communication with an external electronic device. According to various embodiments of the disclosure, an application of performing a radar operation and an application of performing a data communication may be the same application.

An electronic device according to various embodiments of the disclosure may further include a separate module (e.g., a chip set) for a radar function. In this case, the electronic device 101 according to various embodiments of the disclosure may perform a communication function and the radar function in parallel/exclusively (e.g., simultaneously). According to various embodiments of the disclosure, each module (e.g., a module for a radar function and a module for a data communication function) and a processor (e.g., a processor 120 of FIG. 1) may be connected through a separate data path. The electronic device (e.g., the module for the data communication function) according to various embodiments of the disclosure may transmit a message which instructs the external electronic device (e.g., a pair device) which performs a communication to stop performing the communication during a specified time using the module for the data communication function at a time point at which a radar function is started. For example, the specified time may be time which corresponds to the number of training fields determined according to a first scheme. According to various embodiments of the disclosure, the specified time may be a value specified by the processor (e.g., the processor 120 of FIG. 1). The electronic device (e.g., the module for the radar function) according to various embodiments of the disclosure may perform the radar function for the specified time. Information about the specified time according to various embodiments of the disclosure may be shared between modules (e.g., the module for the radar function and the module for the data communication function).

An electronic device 101 according to various embodiments of the disclosure may perform only one of a receiving operation or a transmitting operation for a data communication (e.g., half-duplex). On the other hand, the electronic device 101 according to various embodiments of the disclosure may operate by simultaneously activating the receiving operation and the transmitting operation for a radar function. In the radar function according to various embodiments of the disclosure, a speed of a reflection signal that a signal transmitted from the electronic device 101 is reflected on an external object is very high, so the electronic device 101 may operate in a full-duplex mode if the radar function is activated for detecting a reflection signal.

Figure 17:
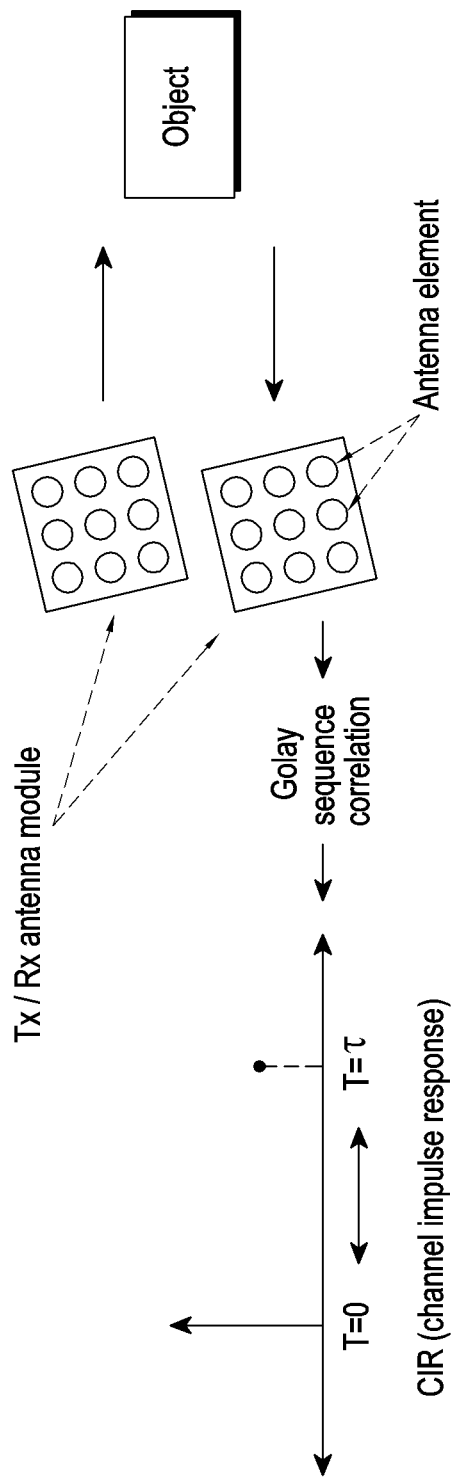
FIG. 17 is a diagram for describing antenna operation mode according to an embodiment of the disclosure.

FIG. 17 is a diagram for describing antenna operation mode according to an embodiment of the disclosure.

Referring to FIG. 17, an electronic device according to various embodiments of the disclosure may include a plurality of antenna modules. A plurality of antenna elements may be included in the plurality of antenna modules according to various embodiments of the disclosure. In a case of a full-duplex mode according to various embodiments of the disclosure, one antenna module of a plurality of antenna modules (e.g., an antenna module 197 of FIG. 1) included in an electronic device 101 may operate in a transmission mode, and another antenna module of the plurality of antenna modules may operate in a reception mode. Alternatively, according to various embodiments of the disclosure, a part (e.g., a patch antenna) of antenna elements (e.g., the patch antennas and/or a dipole antenna) included in one antenna module may operate in a transmission mode, and another part (e.g., the dipole antenna) of the antenna elements may operate in a reception mode.

According to various embodiments of the disclosure, if a data communication function is performed, a PPDU format as shown in FIG. 5 may be used, however, if a radar function is performed, a data format transmitted to the outside may be configured in a data format including only a Golay sequence. According to various embodiments of the disclosure, if the radar function is performed, the data format transmitted to the outside may be configured in a data format which includes only a sequence including a value which maximizes energy or power of a specific signal through auto-correlation. Alternatively, according to various embodiments of the disclosure, the data format transmitted to the outside if the radar function is performed may be configured in a data format including a sequence which is based on cross-correlation. According to various embodiments of the disclosure, if the radar function is performed, the data transmitted to the outside may be configured in a data format which includes only an EDMG (or DMG)-STF and/or an EDMG (or DMG)-CEF. In other words, information about a Golay sequence may be included in an EDMG (or DMG)-STF and/or an EDMG (or DMG)-CEF and transmitted to an external object.

An electronic device (e.g., an electronic device 101 of FIG. 1) according to various embodiments of the disclosure includes an array antenna (e.g., an antenna module 197 of FIG. 1) and a communication circuit (e.g., a communication module 190 of FIG. 1) which is electrically connected to the array antenna, and the communication circuit may configured to: determine a number of specified fields for reserving time for outputting a first signal through the array antenna and receiving a reflection signal that the first signal is reflected on an external object, generate a second signal including information about the number of specified fields, and output the first signal through the array antenna after transmitting the generated second signal to an external electronic device through the array antenna, and receive the reflection signal which corresponds to the output first signal.

The communication circuit (e.g., the communication module 190 of FIG. 1) may be configured to: output the second signal through the array antenna and receive the reflection signal that the second signal is reflected on the external object during reserved time which corresponds to the number of specified fields.

According to various embodiments of the disclosure, the second signal may cause the external electronic device to set a standby state for receiving a training field.

According to various embodiments of the disclosure, the communication circuit (e.g., the communication module 190 of FIG. 1) may be configured to: determine a number of fields for performing beam forming training according to information included in a beam tracking request in case that the beam tracking request is received from the external electronic device.

According to various embodiments of the disclosure, the communication circuit (e.g., the communication module 190 of FIG. 1) may be configured to: include information about a sum of the number of fields for performing the beam forming training and the number of specified fields into an EDMG Header-A field or an EDMG Header-B field included in the first signal.

According to various embodiments of the disclosure, the first signal may include only at least one field of an EDMG-STF or an EDMG-CEF.

According to various embodiments of the disclosure, the first signal and the second signal may be signals having a frequency band from 6 GHz to 300 GHz.

According to various embodiments of the disclosure, the communication circuit (e.g., the communication module 190 of FIG. 1) may be configured to: output the first signal before receiving a signal output from the external electronic device after outputting the second signal.

According to various embodiments of the disclosure, the communication circuit (e.g., the communication module 190 of FIG. 1) may be configured to: identify length of a training field which is inserted into the second signal according to the beam tracking request, and include the information about the number of specified fields into a third signal output from the electronic device after the second signal is output in case that the length of the training field is longer than a specified length, and transmit the third signal to the external electronic device.

According to various embodiments of the disclosure, the communication circuit (e.g., the communication module 190 of FIG. 1) may be configured to: identify a type of an application running on the electronic device, and determine the number of specified fields if the identified type is a pre-specified type. The communication circuit according to various embodiments of the disclosure may obtain specified information (e.g., information about an application ID, information about priorities of specific tasks, information about Quality of Service (QoS), and information about an operation period of an application processor (e.g., a processor 120 of FIG. 1) or the communication circuit) using a scheme specified by the application processor (e.g., using an application programming interface (API)).

According to various embodiments of the disclosure, the communication circuit (e.g., the communication module 190 of FIG. 1) may be configured to determine a distance from the object based on the output first signal and the received reflection signal.

According to various embodiments of the disclosure, the communication circuit (e.g., the communication module 190 of FIG. 1) may be configured to determine the number of specified fields according to running of a specified application which requires a radar function or a specified period.

An electronic device (e.g., an electronic device 101 of FIG. 1) according to various embodiments of the disclosure includes an antenna array and a communication circuit (e.g., a communication module 190 of FIG. 1) which is electrically connected to the antenna array, and the communication circuit may be configured to: determine whether beam forming training needs to be performed at a time point at which a specified function is performed, determine a number of specified fields according to a first scheme in a case that the beam forming training does not need to be performed, and determine the number of specified fields according to a second scheme different from the first scheme in a case that the beam forming training needs to be performed.

According to various embodiments of the disclosure, the communication circuit (e.g., the communication module 190 of FIG. 1) may be configured to output a first signal and receive a reflection signal that the output first signal is reflected on an external object during time which is reserved corresponding to the number of specified fields.

According to various embodiments of the disclosure, whether to perform the beam forming training may be determined according to whether a beam tracking request is received from an external electronic device.

According to various embodiments of the disclosure, the first scheme may include a scheme in which the number of specified fields is determined according to a sum of a number of fields which is determined based on information received from an external electronic device and a number of fields which is determined based on a duration of the specified fields.

According to various embodiments of the disclosure, the second scheme may include a scheme in which the number of specified fields is determined such that the number of specified fields is equal to a number of fields determined based on the duration of the specified fields.

An electronic device (e.g., an electronic device 101 of FIG. 1) according to various embodiments of the disclosure includes an antenna array (e.g., antenna elements of FIG. 17 or antenna modules of FIG. 17), a communication circuit (e.g., a communication module 190 of FIG. 1) which is electrically connected to the antenna array, and at least one processor (e.g., a processor 120 of FIG. 1), and the at least one processor is configured to: set a part of the antenna array to a transmission (Tx) state and set a remaining part of the antenna array to reception (Rx) state in a case that a signal to be output through the communication circuit is a first signal, and set all of the antenna array to the Tx state in a case that the signal to be output through the communication circuit is a second signal. Here, the first signal may include a signal for detecting an object which is located around the electronic device, and the second signal may include a signal which is output for performing a communication with an external electronic device, and, the second signal may include information about a specified field for reserving time for outputting the first signal and receiving a signal that the first signal is reflected on the object.

According to various embodiments of the disclosure, the first signal may be output from the electronic device after the second signal is transmitted to the external electronic device.

According to various embodiments of the disclosure, an electronic device includes information about a specified field in a signal transmitted to an external electronic device to transmit the signal; thereby the external electronic device may maintain a reception standby state for the specified field.

According to various embodiments of the disclosure, an electronic device transmits and receives a radar signal while an external electronic device maintains a reception standby state for a specified field; thereby transmission and reception of a data signal and transmission and reception of the radar signal may be performed together without degrading performance of the electronic device.

Effects according to various embodiments are not limited to effects described above, and it will be apparent to those skilled in the art that various effects are inherent in the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    an array antenna; and
    a communication circuit electrically connected to the array antenna,
    wherein the communication circuit is configured to:
        determine a number of specified fields for reserving time for outputting a first signal through the array antenna and receiving a reflection signal corresponding to the first signal reflected by an external object,
        generate a second signal including information about the number of specified fields, and
        output the first signal through the array antenna and receive the reflection signal corresponding to the first signal, after transmitting the generated second signal to an external electronic device through the array antenna.

2. The electronic device of claim 1, wherein the communication circuit is further configured to:
    output the first signal through the array antenna and receive the reflection signal corresponding to the first signal reflected by the external object during a reserved time which corresponds to the number of specified fields.

3. The electronic device of claim 1, wherein the second signal is configured to cause the external electronic device to set a standby state for receiving a training field.

4. The electronic device of claim 1, wherein the communication circuit is further configured to:
    determine a number of fields for performing beam forming training according to information included in a beam tracking request in case that the beam tracking request is received from the external electronic device.

5. The electronic device of claim 4, wherein the communication circuit is further configured to:
    include information about a sum of the number of fields for performing the beam forming training and the number of specified fields into one of an enhanced directional multi-gigabit (EDMG) Header-A field or an EDMG Header-B field included in the second signal.

6. The electronic device of claim 1, wherein the first signal includes at least one field of an enhanced directional multi-gigabit (EDMG)-shot training field (STF) or an EDMG-channel estimation field (CEF).

7. The electronic device of claim 1, wherein the first signal and the second signal have a frequency band from 6 gigahertz (GHz) to 300 GHz.

8. The electronic device of claim 1, wherein the communication circuit is further configured to:
    output the first signal before receiving a signal output from the external electronic device after outputting the second signal.

9. The electronic device of claim 4, wherein the communication circuit is further configured to:
    identify a length of a training field which is inserted into the second signal according to the beam tracking request, and
    include the information about the number of specified fields into a third signal output from the electronic device after the second signal is output in case that the length of the training field is longer than a specified length, and transmit the third signal to the external electronic device.

10. The electronic device of claim 1, wherein the communication circuit is further configured to:
    identify a type of an application running on the electronic device, and
    determine the number of specified fields in case that the identified type is a specified type.

11. The electronic device of claim 1, wherein the communication circuit is further configured to determine a distance from the external object based on the output first signal and the received reflection signal.

12. The electronic device of claim 1, wherein the communication circuit is further configured to determine the number of specified fields according to running of a specified application which requires a radar function or a specified period.

13. An electronic device comprising:
an antenna array; and
a communication circuit electrically connected to the antenna array,
wherein the communication circuit is configured to:
determine whether beam forming training needs to be performed at a time point at which a specified function is performed,
determine a number of specified fields according to a first scheme in case that the beam forming training does not need to be performed, and
determine the number of specified fields according to a second scheme different from the first scheme in case that the beam forming training needs to be performed.

14. The electronic device of claim 13, wherein the communication circuit is further configured to output a first signal through the array antenna and receive a reflection signal that corresponds to the output first signal reflected by an external object during a time which is reserved corresponding to the number of specified fields.

15. The electronic device of claim 13, wherein whether to perform the beam forming training is determined according to whether a beam tracking request is received from an external electronic device.

16. The electronic device of claim 13, wherein the first scheme includes a scheme in which the number of specified fields is determined such that the number of specified fields is equal to a number of fields which is determined based on a duration of the specified fields.

17. The electronic device of claim 13, wherein the second scheme includes a scheme in which the number of specified fields is determined according to a sum of a number of fields which is determined based on information received from an external electronic device and a number of fields which is determined based on a duration of the specified fields.

18. An electronic device comprising:
an antenna array;
a communication circuit electrically connected to the antenna array; and
at least one processor,
wherein the at least one processor is configured to:
set a part of the antenna array to a transmission (Tx) state and set a remaining part of the antenna array to reception (Rx) state in case that a signal to be output through the communication circuit is a first signal, and
set all of the antenna array to the Tx state in case that the signal to be output through the communication circuit is a second signal,
wherein the first signal includes a signal for detecting an object which is located near the electronic device, and the second signal includes a signal which is output for performing a communication with an external electronic device, and
wherein the second signal includes information about a specified field for reserving time for outputting the first signal and receiving a signal comprising the first signal reflected from the object.

19. The electronic device of claim 18, wherein the first signal includes at least one field of an enhanced directional multi-gigabit (EDMG)-shot training field (STF) or an EDMG-channel estimation field (CEF).

20. The electronic device of claim 18, wherein the first signal is output from the electronic device after the second signal is transmitted to the external electronic device.

21. The electronic device of claim 10, wherein if the application type is the specified type, the electronic device performs data transmission and reception according to a first operation mode, and if the application type is not the specified type, the electronic device performs data transmission and reception according to a second operation mode.

22. The electronic device of claim 21,
wherein the first operation mode comprises a mode in which a time for transmitting and receiving the first signal is reserved by inserting a virtual training field into the second signal, and
wherein the second operation mode comprises a mode of reserving time for performing a radar function or operation using a management frame including a sector sweep (SSW) or clear to send (CTS) frame.

* * * * *